US008010292B2

(12) United States Patent
Kant et al.

(10) Patent No.: US 8,010,292 B2
(45) Date of Patent: Aug. 30, 2011

(54) METHOD AND SYSTEM FOR DETECTING ABNORMAL OPERATION IN A HYDROCRACKER

(75) Inventors: Ravi Kant, Savage, MN (US); John Philip Miller, Eden Prairie, MN (US); Tautho Hai Nguyen, Brooklyn Park, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 672 days.

(21) Appl. No.: 11/863,169

(22) Filed: Sep. 27, 2007

(65) Prior Publication Data

US 2008/0082308 A1    Apr. 3, 2008

Related U.S. Application Data

(60) Provisional application No. 60/847,785, filed on Sep. 28, 2006.

(51) Int. Cl.
*G01V 1/50* (2006.01)
(52) U.S. Cl. ............... 702/13; 702/12; 702/35; 702/130; 702/185; 702/189
(58) Field of Classification Search .................. 208/57, 208/107, 143, 146; 582/251, 240; 700/29; 702/12, 35, 130, 185, 189, 13; 703/12
See application file for complete search history.

(56) References Cited

U.S. PATENT DOCUMENTS

| | | | |
|---|---|---|---|
| 3,663,805 A * | 5/1972 | Carr et al. ........................ 703/12 |
| 4,236,219 A | 11/1980 | Killebrew et al. |
| 5,960,214 A | 9/1999 | Sharpe, Jr. et al. |
| 6,017,143 A | 1/2000 | Eryurek et al. |
| 6,466,877 B1 * | 10/2002 | Chen et al. ....................... 702/35 |
| 6,824,675 B2 * | 11/2004 | Boyer et al. .................... 208/146 |
| 7,085,610 B2 | 8/2006 | Eryurek et al. |
| 7,657,399 B2 * | 2/2010 | Miller et al. ................... 702/183 |
| 2006/0074598 A1 * | 4/2006 | Emigholz et al. .............. 702/185 |
| 2008/0027677 A1 | 1/2008 | Miller et al. |
| 2008/0027678 A1 | 1/2008 | Miller |
| 2008/0052039 A1 | 2/2008 | Miller et al. |
| 2008/0125877 A1 * | 5/2008 | Miller et al. .................... 700/29 |
| 2008/0125879 A1 | 5/2008 | Miller |

OTHER PUBLICATIONS

International Search Report and Written Opinion for International Application No. PCT/US2007/079917, dated May 29, 2008.
Written Opinion of the International Searching Authority for International Application No. PCT/US2007/079917, dated Mar. 31, 2009.
Notification of the First Office Action—Chinese Patent Application No. 200780036115.4 dated Jul. 14, 2010.
Notification of the First Office Action in Chinese Application No. 200780036115.4 dated Apr. 8, 2011, 20 pages.

* cited by examiner

*Primary Examiner* — Michael P Nghiem
*Assistant Examiner* — Elias Desta
(74) *Attorney, Agent, or Firm* — Marshall, Gerstein & Borun LLP

(57) ABSTRACT

A system and method for detecting abnormal operation of a hydrocracker includes a hydrocracker model. The model may be configurable to include one or more regression models corresponding to different operating regions of the portion of the hydrocracker. The system and method may also determine if a monitored temperature difference variable deviates significantly from the temperature difference variable predicted by the model. If there is a significant deviation, this may indicate an abnormal operation.

9 Claims, 19 Drawing Sheets

METHOD AND SYSTEM FOR DETECTING ABNORMAL OPERATION IN A HYDROCRACKER

CROSS-REFERENCES TO RELATED APPLICATIONS

This application claims priority from U.S. Provisional Application Ser. No. 60/847,785 which was filed on Sep. 28, 2006, entitled "ABNORMAL SITUATION PREVENTION IN A HYDROCRACKER." The above-referenced provisional patent application is hereby incorporated by reference herein, in its entirety.

TECHNICAL FIELD

This disclosure relates generally to process control systems and, more particularly, to systems for monitoring and/or modeling hydrocrackers.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamps) signals to and from the process controller via an analog bus or analog lines. These 4 to 20 mA signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self calibration, identification, diagnostics, etc. A number of standard and open smart device communication protocols such as the HART®, PROFIBUS®, WORLDFIP®, Device Net®, and CAN protocols, have been developed to enable smart field devices made by different manufacturers to be used together within the same process control network. Moreover, the all digital, two wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In this case, the Fieldbus field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-integral-derivative (PID) control routine. The different function blocks within a process control system are configured to communicate with each other (e.g., over a bus) to form one or more process control loops, the individual operations of which are spread throughout the process and are, thus, decentralized.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as Object Linking and Embedding (OLE) for Process Control (OPC) connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the AMS™ Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, the Machinery Health® application provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics," now U.S. Pat. No. 7,085,610, (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then be sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Other techniques have been developed to monitor and detect problems in a process plant. One such technique is referred to as Statistical Process Control (SPC). SPC has been used to monitor variables, such as quality variables, associated with a process and flag an operator when the quality variable is detected to have moved from its "statistical" norm. With SPC, a small sample of a variable, such as a key quality variable, is used to generate statistical data for the small sample. The statistical data for the small sample is then compared to statistical data corresponding to a much larger sample of the variable. The variable may be generated by a laboratory or analyzer, or retrieved from a data historian. SPC alarms are generated when the small sample's average or standard deviation deviates from the large sample's average or standard deviation, respectively, by some predetermined amount. An intent of SPC is to avoid making process adjustments based on normal statistical variation of the small samples. Charts of the average or standard deviation of the small samples may be displayed to the operator on a console separate from a control console.

Another technique analyzes multiple variables and is referred to as multivariable statistical process control (MSPC). This technique uses algorithms such as principal component analysis (PCA) and partial least squares (PLS) which analyze historical data to create a statistical model of the process. In particular, samples of variables corresponding to normal operation and samples of variables corresponding to abnormal operation are analyzed to generate a model to determine when an alarm should be generated. Once the model has been defined, variables corresponding to a current process may be provided to the model, which may generate an alarm if the variables indicate an abnormal operation.

With model-based performance monitoring system techniques, a model is utilized, such as a correlation-based model or a first-principles model, that relates process inputs to process outputs. The model may be calibrated to the actual plant operation by adjusting internal tuning constants or bias terms. The model can be used to predict when the process is moving into an abnormal region and alert the operator to take action. An alarm may be generated when there is a significant deviation in actual versus predicted behavior or when there is a big change in a calculated efficiency parameter. Model-based performance monitoring systems typically cover as small as a single unit operation (e.g. a pump, a compressor, a heater, a column, etc.) or a combination of operations that make up a process unit (e.g. crude unit, fluid catalytic cracking unit (FCCU), reformer, etc.).

Yet another technique utilizes a model configurable to include multiple regression models corresponding to different operating regions. This procedure is disclosed in U.S. patent application Ser. No. 11/492,467, filed on Jul. 25, 2006 and entitled "Method and System for Detecting Abnormal Operation in a Process Plant." The entire disclosure of this application is hereby incorporated by reference herein. Generally speaking, this technique generates and utilizes the model by determining if the actual operation deviates from the operation predicted by the model. If the deviation is significant, this may indicate an abnormal operation. If the operation moves to a different operating region, a new regression model is developed for that region and the model is updated to include the new operating region. Further developments of this technique have included models for a level regulatory control loop to generate a prediction of a signal associated with regulatory control of a level of material in a tank as disclosed in U.S. patent application Ser. No. 11/492,577, filed on Jul. 25, 2006 and entitled "Method and System for Detecting Abnormal Operation of a Level Regulatory Control Loop," using a mean signal or other statistical signal generated by processing a measured process variable, and analyzing the signal to determine if it significantly deviates from an expected value as disclosed in U.S. patent application Ser. No. 11/492,347, now U.S. Pat. No. 7,657,399, filed on Jul. 25, 2006 and entitled "Methods and Systems for Detecting Deviation of a Process Variable from Expected Values," and as disclosed in U.S. patent application Ser. No. 11/492,460, filed on Jul. 25, 2006 and entitled "Methods and Systems for Detecting Deviation of a Process Variable from Expected Values." The entire disclosures of these applications are hereby incorporated by reference herein.

While the above techniques may be applied to a variety of process industries, refining is one industry in which abnormal situation prevention is particularly applicable. More particularly, abnormal situation prevention is particularly applicable to hydrocrackers as used in the refining industry. Generally, a hydrocracker unit in a refinery uses hydrogen to "crack" heavier hydrocarbons into lighter hydrocarbons. For example, complex organic molecules (e.g., heavy hydrocarbons) are broken down into simpler molecules (e.g. light hydrocarbons) by the breaking of carbon-carbon bonds. The rate of cracking and the end products are dependent on the temperature. One particular problem associated with hydrocrackers is that of temperature runaway, which can occur in a reactor of the hydrocracker.

SUMMARY OF THE DISCLOSURE

Example methods and systems are disclosed that may facilitate detecting an abnormal operation associated with a hydrocracker. Generally speaking, a model to model at least a portion of the hydrocracker may be configurable to include multiple regression models corresponding to multiple different operating regions of the hydrocracker. The model may be utilized, for example, by determining if the actual operation of the hydrocracker deviates significantly from the operation predicted by the model. If there is a significant deviation, this may indicate an abnormal operation.

In one embodiment, a method of detecting an abnormal operation of a hydrocracker is disclosed. The method may include collecting first data sets for the hydrocracker while the hydrocracker is in an operating region and generating a regression model of the hydrocracker in the operating region using the first data sets. The first data sets may be generated from a temperature difference variable between first and second cross sections in a reactor of the hydrocracker in the operating region. The first data sets may be further generated from a load variable of the hydrocracker in the operation region. The regression model may be used to generate a prediction of first data generated from the temperature difference variable as a function of second data generated from the load variable. Then, the method determines if a corresponding signal generated from the temperature difference variable deviates from the prediction of the first data generated from the temperature difference variable to detect an abnormal situation within the hydrocracker.

In another embodiment, a method of detecting an abnormal operation of a hydrocracker is disclosed. The method may include collecting a plurality of first data sets for the hydrocracker while the hydrocracker is in an operating region and generating a regression model of the hydrocracker in the operating region for each temperature difference variable using the plurality of first data sets. Each of the plurality of first data sets may be generated from a corresponding temperature difference variable between cross sections in a reactor of the hydrocracker in the operating region and from a load variable of the hydrocracker in the operating region. The regression model may be used to generate a prediction of first data generated from each of the temperature difference variables as a function of second data generated from the load variable. Then, the method determines if a corresponding signal generated from at least one of the temperature difference variables deviates from the prediction of the first data generated from the corresponding temperature difference variable to detect an abnormal situation within the hydrocracker.

In a further embodiment, a method of facilitating detection of an abnormal operation of a hydrocracker is disclosed. The method may include collecting first data sets while the hydrocracker is in a first operating region, and collecting second data sets while the hydrocracker is in a second operating region. The first and second data sets may be generated from a temperature difference variable between first and second cross sections in a reactor of the hydrocracker and further generated from a load variable of the hydrocracker. A first regression model of the process in the first operating region may be generated using the first data sets, and a second regression model of the hydrocracker may be generated in the second operating region using the second data sets. The method may determine a first range in which the first regression model is valid and a second range in which the second regression model is valid. A model of the hydrocracker may be generated to include the first regression model and revised to include the second regression model for the second range along with the first regression model in the first range.

In yet another embodiment, a system for detecting an abnormal operation of a hydrocracker in a process plant is disclosed. The system may include a configurable model of the hydrocracker in the process plant. The configurable model may include a first regression model in a first range corresponding to a first operating region of the hydrocracker. The configurable model may be subsequently configured to include a second regression model in a second range corresponding to a second operating region different than the first operating region. The configurable model may generate a prediction of a temperature difference variable value as a function of a load variable value. The temperature difference variable value may be generated from a temperature difference between first and second cross sections in a reactor of the hydrocracker. The system may further include a deviation detector coupled to the configurable model. The deviation detector may determine if the temperature difference variable value differs from the predicted temperature difference variable value by comparing a difference between the temperature difference variable value and predicted temperature difference variable value to a threshold.

In a yet further embodiment, a system for detecting an abnormal operation in a hydrocracker in a process plant is disclosed. The system may include a configurable model of the hydrocracker in the process plant. The configurable model may include a regression model in a range corresponding to an operating region of the hydrocracker. The configurable model may generate a prediction of a temperature difference variable value as a function of a load variable value. The temperature difference variable value may be generated from a temperature difference between first and second cross sections in a reactor of the hydrocracker. The system may further include a deviation detector coupled to the configurable model. The deviation detector may determine if the temperature difference variable value differs from the predicted temperature difference variable value by comparing a difference between the temperature difference variable value and predicted temperature difference variable value to a threshold. The system may also include an integration application that creates a representation of the hydrocracker for use in viewing the temperature difference variable value and for use in viewing an indication of an abnormal operation of the hydrocracker in response to comparing the difference between the temperature difference variable value and the predicted temperature difference variable value to a threshold.

DETAILED DESCRIPTION

Figure 1:
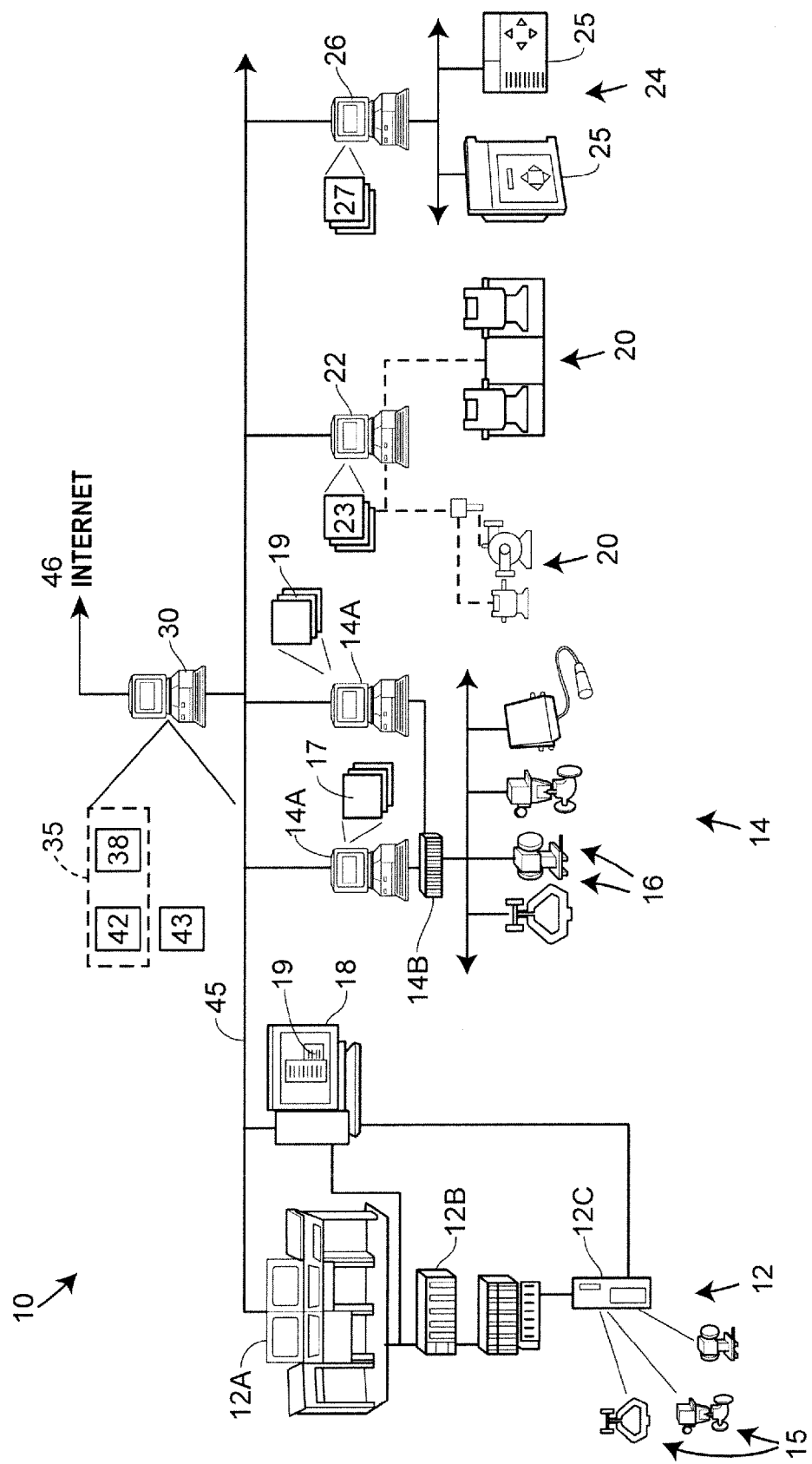
FIG. 1 is an exemplary block diagram of a process plant having a distributed control and maintenance network including one or more operator and maintenance workstations, controllers, field devices and supporting equipment.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42, which will be described in more detail below. Additionally, the computer system 30 may implement an alert/alarm application 43.

Generally speaking, the abnormal situation prevention system 35 may communicate with abnormal operation detection systems (not shown in FIG. 1) optionally located in the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on handheld devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

Figure 2A:
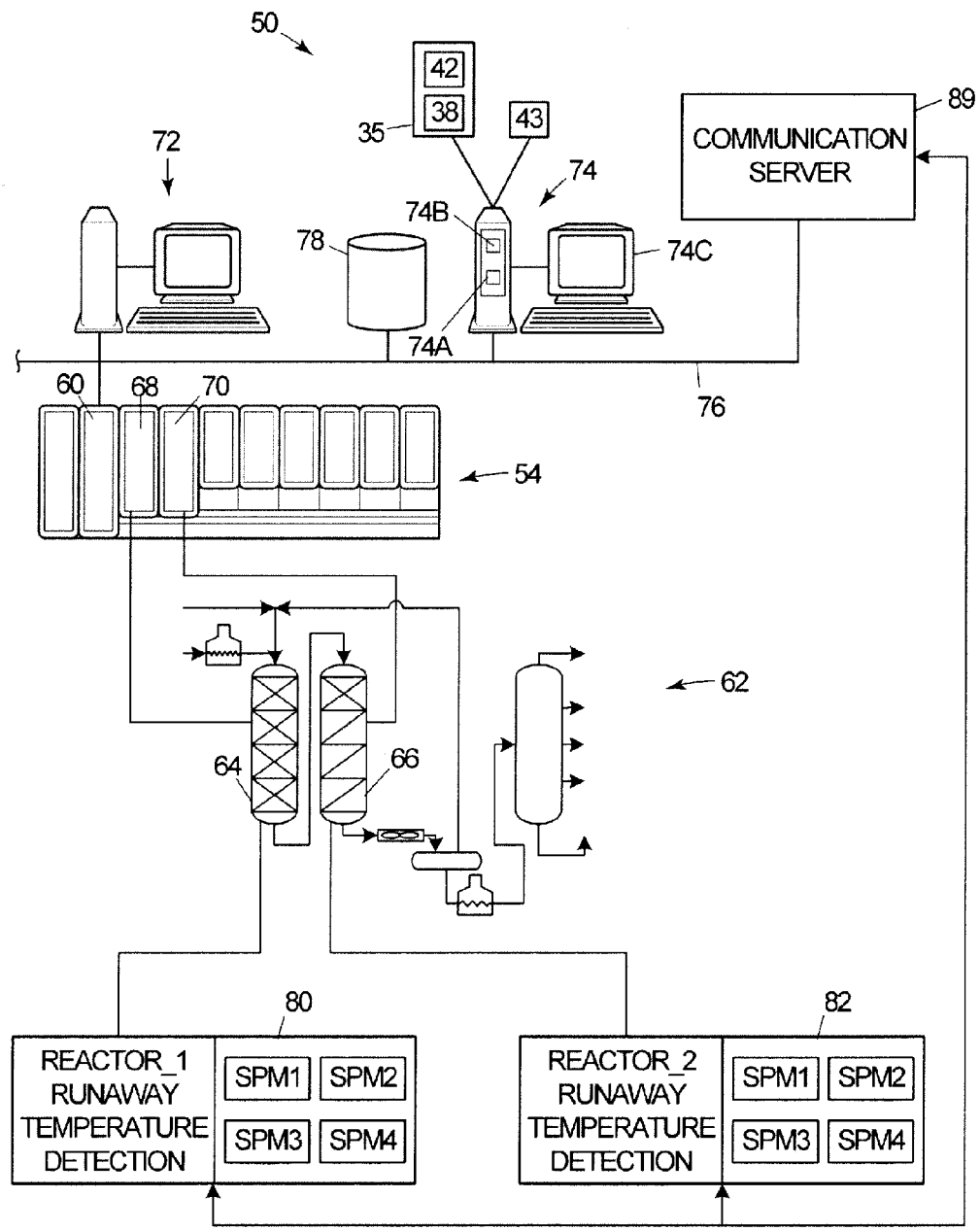
FIG. 2A is an exemplary block diagram of a portion of the process plant of FIG. 1, illustrating communication interconnections between various components of an abnormal situation prevention system located within a hydrocracker of the process plant.

FIG. 2A illustrates a portion 50 of the example process plant 10 of FIG. 1 for the purpose of describing one manner in which the abnormal situation prevention system 35 and/or the alert/alarm application 43 may communicate with a hydrocracker in the portion 50 of the example process plant 10. In one example, the process plant 10 or portion 50 of the process plant may be a refinery plant for breaking complex molecules down into simpler molecules (e.g., "cracking" heavier hydrocarbons into lighter hydrocarbons). While FIG. 2A illustrates communications between the abnormal situation prevention system 35 and one or more abnormal operation detection systems within the hydrocracker, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2A includes a distributed process control system 54 having one or more process controllers 60 connected to one or more reactors 64 and 66 of a hydrocracker 62 via input/output (I/O) cards or devices 68 and 70, which may be any desired types of I/O devices conforming to any desired communication or controller protocol. Additionally, the hydrocracker 62 and/or the reactors 64, 66 of the hydrocracker 62 may conform to any desired open, proprietary or other communication or programming protocol, it being understood that the I/O devices 68 and 70 must be compatible with the desired protocol used by the hydrocracker 62 and reactors 64, 66.

Although not shown in detail, the hydrocracker 62 and reactors 64, 66 may include any number of additional devices, including, but not limited to, field devices, HART devices, sensors, valves, transmitters, positioners, etc. any or all of which may be used to measure and/or collect data, such as process variable data related to the hydrocracker 62, and the reactors 64, 66, and the operation thereof. For example, as discussed herein, a temperature difference variable is monitored with respect to a reactor. The temperature difference variable may be derived from temperature sensors, transmitters or other devices that measure the temperature at one or more locations of various cross-sections or "beds" in the reactor. These devices, or additional devices, may be used to calculate the weighted average bed temperature (WABT) at each cross-section and determine the temperature difference variable $\Delta T$ between the various cross-sections. As such, although the following generally described the temperature difference variable as being provided from the hydrocracker 62 and its reactors 64, 66, it should be understood that the temperature difference variable and/or the temperature measurements used to derived the temperature difference variable, may, more particularly, be provided from the devices that are part of the hydrocracker 62 and reactors 64, 66, such as temperature sensors, transmitters, etc.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and the hydrocracker 62, including the reactors 64, 66, within the process plant 10. Thus, the database 78 may operate as a configuration database to store the current configuration, including process configuration modules, as well as control configuration information for the process control system 54 as downloaded to and stored within the process controllers 60 and devices of the hydrocracker 62, including the reactors 64, 66. Likewise, the database 78 may store historical abnormal situation prevention data, including statistical data collected by the hydrocracker 62, including the reactors 64, 66 (or more particularly devices of the hydrocracker 62 and/or reactors 64, 66), statistical data determined from process variables collected by the hydrocracker 62, including the reactors 64, 66 (or more particularly devices of the hydrocracker 62 and/or reactors 64, 66), and other types of data that will be described below.

While the process controllers 60, I/O devices 68 and 70, hydrocracker 62, the reactors 64, 66 and devices of the hydrocracker 62 and reactors 64, 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc. Although only one hydrocracker 62 is shown with only two reactors 64, 66, it should be understood that a process plant 10 may have multiple hydrocrackers along with various other types of equipment such as that shown in FIG. 1. It should be further understood that a hydrocracker may include any number of reactors. The abnormal situation prevision techniques described herein may be equally applied to any of a number of reactors or hydrocrackers.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2A, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the reactors 64, 66 and the hydrocracker 62, and/or the devices of the reactors 64, 66 and hydrocracker 62 in particular, may include a memory (not shown) for storing routines such as routines for implementing statistical data collection pertaining to one or more process variables sensed by sensing device and/or routines for abnormal operation detection, which will be described below. Each of one or more of the reactors 64, 66 and the hydrocracker 62, and/or some or all of the devices thereof in particular, may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2A, the reactors 64, 66 (and potentially some or all reactors in a hydrocracker 62) include abnormal operation detection blocks 80 and 82, which will be described in more detail below. While the blocks 80 and 82 of FIG. 2 are illustrated as being located in one of the reactors 64, 66, these or similar blocks could be located in any number of reactors or within various other equipment and devices in the hydrocracker 62 or the reactors 64, 66, could be located in other devices, such as the controller 60, the I/O devices 68, 70 or any of the devices illustrated in FIG. 1. Additionally, the blocks 80 and 82 could be in any subset of the reactors 64, 66, such as in one or more devices of the reactors 64, 66, for example (e.g., temperature sensor, temperature transmitter, etc.).

Generally speaking, the blocks 80 and 82 or sub-elements of these blocks, collect data, such a process variable data, from the device in which they are located and/or from other devices. For example, the blocks 80, 82 may collect the temperature difference variable from devices within the hydrocracker 62 or the reactors 64, 66, such as a temperature sensor, a temperature transmitter, or other devices, or may determine the temperature difference variable from temperature measurements from the devices. Additionally, the blocks 80 and 82 or sub-elements of these blocks may process the variable data and perform an analysis on the data for any number of reasons. For example, the block 80, which is illustrated as being associated with a reactor 64 (Reactor_1), may have a runaway temperature detection routine which analyzes temperature difference process variable data to determine if a temperature difference between two cross-sections in the reactor 64 is increasing, which may be indicative of a runaway temperature.

Figure 2B:
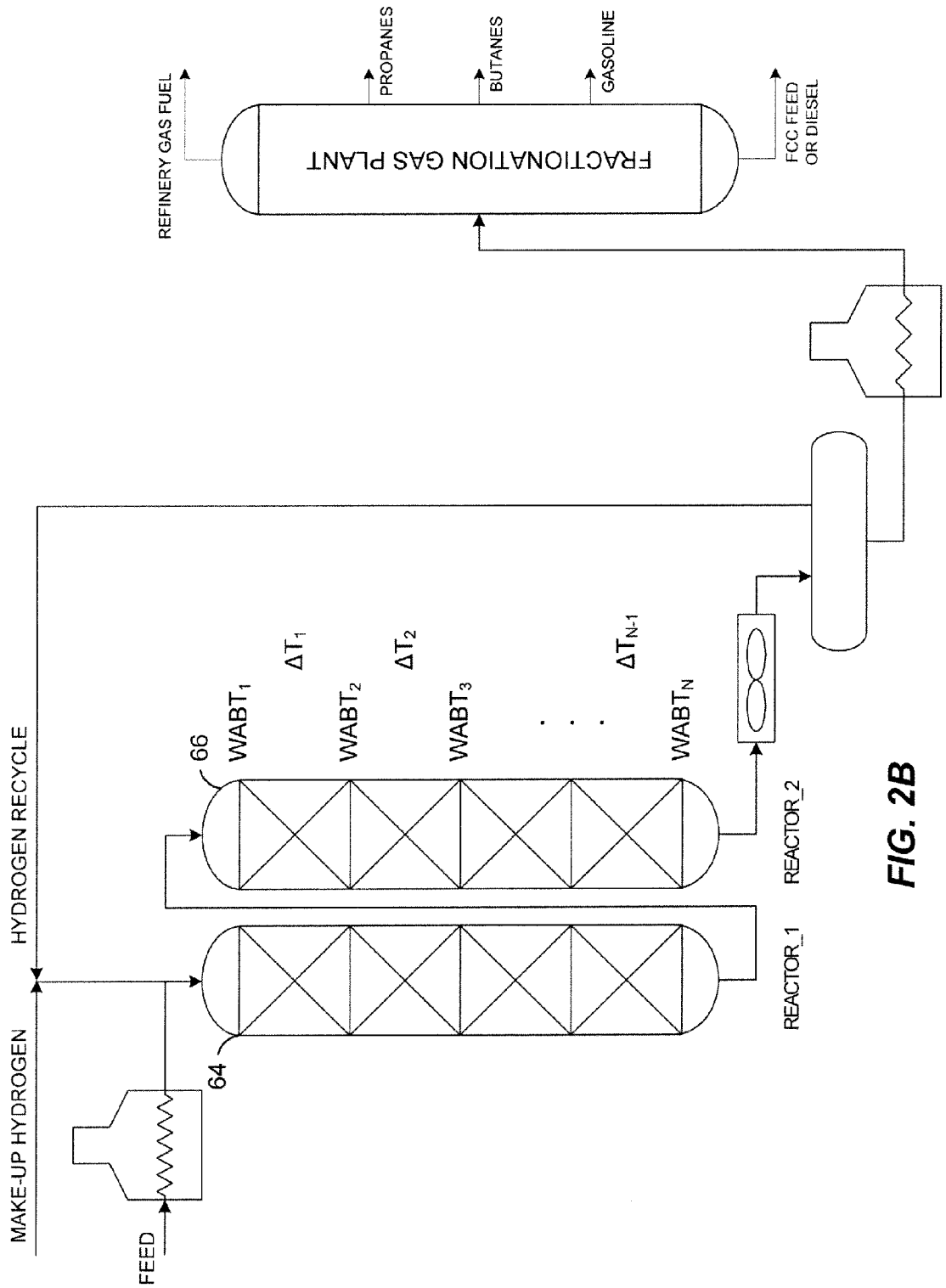
FIG. 2B is an exemplary block diagram of the hydrocracker of FIG. 2A.

FIG. 2B is a more detailed example of the hydrocracker 62 shown in FIG. 2A. As seen in FIG. 2B, each reactor 64, 66 includes multiple cross-sections or "beds" across the reactor at which a cross-sectional temperature is measured. In one example, the temperature of each cross-section is a Weighted Average Bed Temperature (WABT). The WABT for each cross-section may be provided as a weighted average of multiple temperature measurements $T_i$ that are measured at the cross-section. Each temperature has an associated weight ($w_i$), which may be provided as a user input. The weighted average bed temperature at a given cross-section may be calculated by the following formula:

$$WABT = \frac{\sum_i w_i T_i}{\sum_i w_i}$$

A temperature difference variable ($\Delta T$) between each pair of WABT's is calculated. Generally, there are n WABT's, and n−1 $\Delta T$'s. An increase in any of the $\Delta T$'s could indicate a runaway temperature condition. In one example, the abnormal situation prevention technique for a hydrocracker learns baseline values for each of the $\Delta T$'s, and during monitoring, if the new value for any of the $\Delta T$'s significantly deviates from the baseline value, for example, by more than a certain threshold, a temperature runaway indicator, such as an alert/alarm, is generated. The alert may specify in which of the of the $\Delta T$'s ($\Delta T_1, \Delta T_2, \ldots$) the abnormal condition has occurred. However, the values of the $\Delta T$'s may also change as a function of some load variable during normal operating conditions. As described further below, a regression algorithm may be used to model the value of each $\Delta T$ as a function of that load variable. While monitoring the reactors during operation, the runaway temperature condition may be detected if the actual and predicted values for $\Delta T$ differ substantially, for example by a threshold. The general operation of hydrocrackers is generally understood by those of ordinary skill in the art and need not be further described.

Referring again to FIG. 2A, the block 80 may include a set of one or more statistical process monitoring (SPM) blocks or units such as blocks SPM1-SPM4 which may collect process variable or other data within the reactor and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. The specific statistical data generated, and the method in which it is generated is not critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, such as the temperature difference variable, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the blocks 80 and 82 are shown to include SPM blocks in FIG. 2A, the SPM blocks may instead be stand-alone blocks separate from the blocks 80 and 82, and may be located in the same reactor as the corresponding block 80 or 82 or may be in a different device. The SPM blocks discussed herein may comprise known FOUNDATION™ Fieldbus SPM blocks, or SPM blocks that have different or additional capabilities as compared with known FOUNDATION™ Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the FOUNDATION™ Fieldbus protocol, or some other protocol, such as Profibus, HART, CAN, etc. protocol. If desired, the underlying operation of blocks 80, 82 may be performed or implemented at least partially as described in U.S. Pat. No. 6,017,143, which is hereby incorporated by reference herein.

It is to be further understood that although the blocks 80 and 82 are shown to include SPM blocks in FIG. 2A, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM block located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The blocks 80, 82 of FIG. 2A, which are illustrated as being associated with a reactor 64, 66, and more particularly with a temperature sensor or transmitter thereof, for example, may each have a runaway temperature detection unit that analyzes the process variable data collected by the temperature sensor or transmitter to determine if a temperature difference variable associated with the reactor significantly deviates from the expected temperature difference variable. In addition, the block 82 may include one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data.

Overview of an Abnormal Operation Detection (AOD) System in a Hydrocracker

Figure 3A:
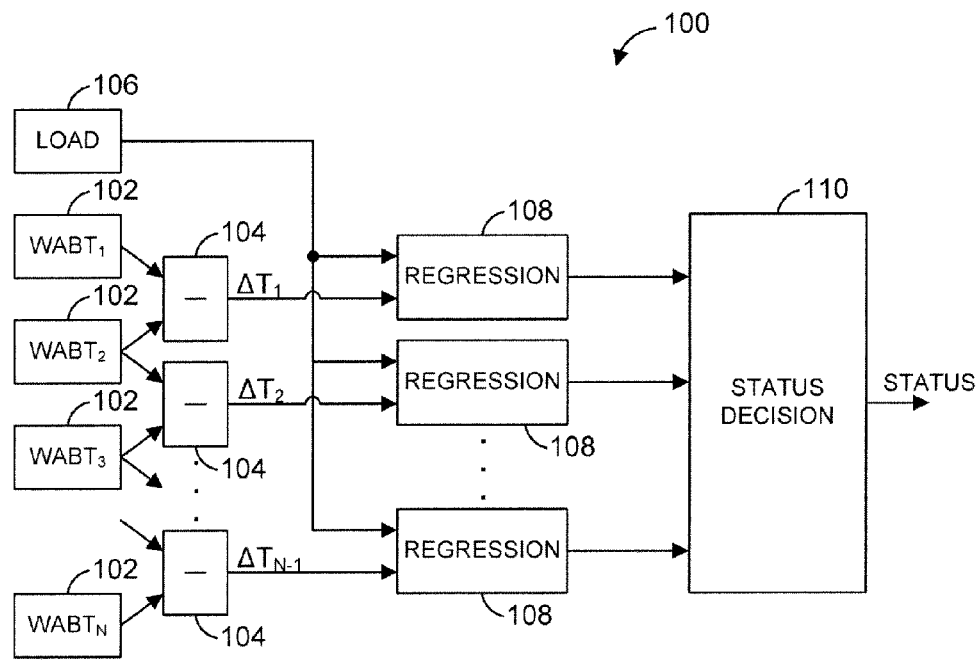
FIG. 3A is an example abnormal operation detection (AOD) system that utilizes one or more regression models.

FIG. 3A is a block diagram of an example abnormal operation detection (AOD) system 100 that could be utilized in the abnormal operation detection blocks 80, 82 or as the abnormal operation detection system 42 of FIG. 2 for a hydrocracker reactor abnormal situation prevention module. The AOD system 100 may be used to detect abnormal operations, also referred to as abnormal situations, that have occurred or are occurring in the hydrocracker 62 or hydrocracker reactor 64, 66, such as runaway temperatures. In addition, the AOD system 100 may be used to predict the occurrence of abnormal operations within the hydrocracker 62 or reactors 64, 66 before these abnormal operations actually arise, with the purpose of taking steps to prevent the predicted abnormal operation before any significant loss within the reactors 64, 66, the hydrocracker 66 or the process plant 10 takes place, for example, by operating in conjunction with the abnormal situation prevention system 35.

In one example, each reactor may have a corresponding AOD system 100, though it should be understood that a common AOD system may be used for multiple reactors or for the hydrocracker as a whole. As noted above, there are generally n WABT's 102, and n−1 $\Delta T$'s 104, where an increase in any $\Delta T$'s 104 could indicate a runaway temperature condition. However, because it is also possible that the $\Delta T$'s 104 could change during normal operating conditions as a function of some load variable 106, the AOD system 100 learns the normal or baseline $\Delta T$ values 104 for a range of values for the load variable 106.

As shown in FIG. 3A, the load variable 106 and each $\Delta T$ variable 104 are fed into respective regression blocks 108. The AOD system 100 includes regression blocks for each temperature difference variable $\Delta T_{N-1}$. During the learning phase, which is described in more detail below, each regression block 108 creates a regression model to predict data generated from the corresponding $\Delta T$ as a function of data generated from the load variable. The data generated from $\Delta T$ and data generated from the load variable may include $\Delta T$ and load variable data, $\Delta T$ and load variable data that has been filtered or otherwise processed, statistical data generated from $\Delta T$ and load variable data, etc. During the monitoring phase, which is also described in more detail below, the regression model predicts a value for its data generated from $\Delta T$ given a value of data generated from the load variable during operation of the reactor. Each regression block outputs a status based upon a deviation, if any, between the predicted value of data generated from $\Delta T$ and a monitored value of data generated from $\Delta T$ for a given value of data generated from the load variable. For example, if the monitored value of $\Delta T$ significantly deviates from the predicted value of $\Delta T$, the regression block 108 may output a status of "Up", which is an indication that a runaway temperature is occurring for the corresponding temperature difference variable $\Delta T$. Otherwise, the regression block 108 may output the status as "Normal". In another example, if the monitored mean value of $\Delta T$ significantly deviates from a predicted mean value of $\Delta T$, the regression block 108 may output the status of "Up", or otherwise output the status as "Normal". A status decision block 110 receives the status from each regression block 108 and determines the status of the reactor. If any of the regression blocks 108 have a status of "Up", the status of the reactor is "runaway temperature" for the corresponding temperature difference value $\Delta T$. However, it should also be understood that the status decision block 110 may receive the status from other regression blocks 108, such as regression blocks 108 for other reactors, and determine the status of the hydrocracker

62. The monitored value of data generated from ΔT may be derived by a variety of methods, including sensor measurements, modeled measurements based on other monitored process measurements, statistical measurements, analysis results, etc. As discussed further below, the monitored temperature difference variable may be the raw monitored values of the temperature difference variable, an output of an SPM block or other values generated from the temperature difference variable.

Figure 3B:
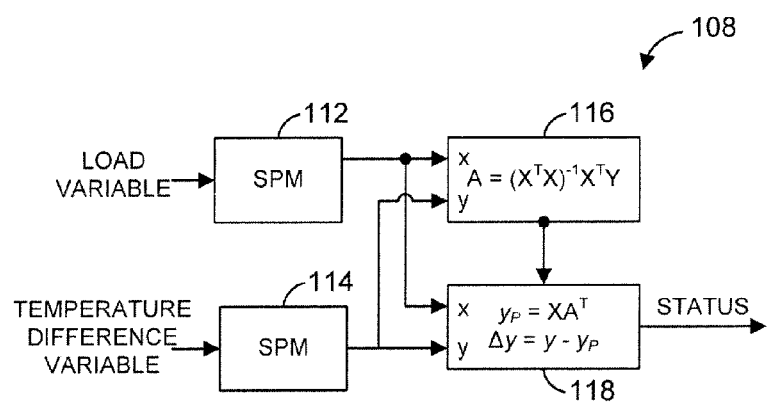
FIG. 3B is an example regression block of the AOD system of FIG. 3A.

FIG. 3B is a block diagram of an example of a regression block 108 shown in FIG. 3A. As shown in FIG. 3B, the regression block 108 includes a first SPM block 112 and a second SPM block 114 each coupled to a model 116. The first SPM block 112 receives the load variable and generates first statistical data from the load variable. The first statistical data could be any of various kinds of statistical data such as mean data, median data, standard deviation data, rate of change data, range data, etc., calculated from the load variable. Such data could be calculated based on a sliding window of the load variable data or based on non-overlapping windows of the load variable data. As one example, the first SPM block 112 may generate mean and standard deviation data over a user-specified sample window size, such as a most recent load variable sample and 49 previous samples of the load variable. In this example, a mean load variable value and a standard deviation load variable value may be generated for each new load variable sample received by the first SPM block 112. As another example, the first SPM block 112 may generate mean and standard deviation data using non-overlapping time periods. In this example, a window of five minutes (or some other suitable time period) could be used, and a mean and/or standard deviation load variable value would thus be generated every five minutes. In a similar manner, the second SPM block 114 receives the temperature difference ΔT between cross sections of the reactor (e.g., between $WABT_1$ and $WABT_2$) as a variable and generates second statistical data from the temperature difference variable in a manner similar to the SPM block 112, such as mean and standard deviation data over a specified sample window.

The model 116 includes a load variable input, which is an independent variable input (x), from the SPM 112 and a temperature difference variable input, which is a dependent variable input (y), from the SPM 114. As will be described in more detail below, the model 116 may be trained using a plurality of data sets (x, y), to model the temperature difference variable as a function of the load variable. For purposes of explaining the operation of the AOD system, the temperature difference variable ΔT is now described as the temperature difference variable Y, and references to both ΔT and Y may be used interchangeably to refer to any of the temperature difference variables $\Delta T_1$-$\Delta T_{N-1}$. The model 116 may use the mean, standard deviation or other statistical measure of the load variable (X) and the temperature difference variable (Y) from the SPM's 112, 114 as the independent and dependent variable inputs (x, y) for regression modeling. For example, the means of the load variable and the temperature difference variable may be used as the (x, y) point in the regression modeling, and the standard deviation may be modeled as a function of the load variable and used to determine the threshold at which an abnormal situation is detected during the monitoring phase. As such, it should be understood that while the AOD system 100 is described as modeling the temperature difference variable as a function of the load variable, the AOD system 100 may model various data generated from the temperature difference variable as a function of various data generated from the load variable based on the independent and dependent inputs provided to the regression model, including, but not limited to, temperature difference and load variable data, statistical data generated from the temperature difference and load variable data, and temperature difference and load variable data that has been filtered or otherwise processed. Further, while the AOD system 100 is described as predicting values of the temperature difference variable and comparing the predicted values to monitored values of the temperature difference variable, the predicted and monitored values may include various predicted and monitored values generated from the temperature difference variable, such as predicted and monitored temperature difference data, predicted and monitored statistical data generated from the temperature difference data, and predicted and monitored temperature difference data that has been filtered or otherwise processed.

As will also be described in more detail below, the model 116 may include one or more regression models, with each regression model provided for a different operating region. As such, multiple regression models may be provided for each temperature difference variable ($\Delta T_1, \Delta T_2, \ldots, \Delta T_{N-1}$), with the regression models for each temperature difference variable corresponding to different operating regions associated with the hydrocracker in general and/or with a reactor in particular. Each regression model may utilize a function to model the dependent temperature difference variable as a function of the independent load variable over some range of the load variable. The regression model may comprise a linear regression model, for example, or some other regression model. Generally, a linear regression model comprises some linear combination of functions f(X), g(X), h(X), . . . . For modeling an industrial process, a typically adequate linear regression model may comprise a first order function of X (e.g., Y=m*X+b) or a second order function of X (e.g., Y=a*$X^2$+b*X+c).

In the example shown in FIG. 3B, the (x, y) points are stored during the learning phase. At the end of the learning phase, the regression coefficients are calculated to develop a regression model to predict the temperature difference variable as a function of the load variable. The maximum and minimum values of the load variable used to develop the regression model are also stored. The model 116 may be calculated as a function of observed load variable values (x) and corresponding observed temperature difference variable values (y) (e.g., $A=(X^TX)^{-1}X^TY$). In one example, the regression fits a polynomial of order p, such that predicted values ($y_P$) for the temperature difference variable Y may be calculated based on the load variable values (x) (e.g., $y_P = a_0 + a_1 + \ldots + a_p x^p$). Generally, the order of the polynomial p would be a user input, though other algorithms may be provided that automate the determination of the order of the polynomial. Of course, other types of functions may be utilized as well such as higher order polynomials, sinusoidal functions, logarithmic functions, exponential functions, power functions, etc.

After it has been trained, the model 116 may be utilized by the deviation detector 118 to generate a predicted value ($y_P$) of the dependent temperature difference variable Y based on a given independent load variable input (x) during a monitoring phase. The deviation detector 118 further utilizes a monitored temperature difference variable input (y) and the independent load variable input (x) to the model 116. Generally speaking, the deviation detector 118 calculates the predicted value ($y_P$) for a particular load variable value and uses the predicted value as the "normal" or "baseline" temperature difference. The deviation detector 118 compares the monitored temperature difference variable value (y) to the predicted temperature difference value ($y_P$) to determine if the monitored temperature difference variable value (y) is significantly deviating from the predicted temperature difference value ($y_P$) (e.g., $\Delta y = y - y_P$). If the monitored temperature difference variable value (y) is significantly deviating from the predicted value ($y_P$), this may indicate that an abnormal situation has occurred, is occurring, or may occur in the near future, and thus the deviation detector 118 may generate an indicator of the deviation. For example, if the monitored $\Delta T$ value (y) is higher than the predicted $\Delta T$ value ($y_P$) and the difference exceeds a threshold, an indication of an abnormal situation (e.g., "Up") may be generated. If not, the status is "normal". In some implementations, the indicator of an abnormal situation may comprise an alert or alarm.

In addition to monitoring the hydrocracker for abnormal situations, the deviation detector 118 may also check to see if the load variable is within the limits seen during the development and training of the model. For example, during the monitoring phase the deviation detector 118 monitors whether a given value for the load variable is within the operating range of the regression model as determined by the minimum and maximum values of the load variable used during the learning phase of the model. If the load variable value is outside of the limits, the deviation detector 118 may output a status of "Out of Range" or other indication that the load variable is outside of the operating region for the regression model. The regression block 108 may either await an input from a user to develop and train a new regression model for the new operating region or automatically develop and train a new regression model for the new operating region, examples of which are provided further below.

One of ordinary skill in the art will recognize that the AOD system 100 and the regression block 108 can be modified in various ways. For example, the SPM blocks 112 and 114 could be omitted, and the raw values of the load variable and temperature difference value are provided directly to the model 116 as the (x, y) points used for regression modeling and provided directly to the deviation detector 118 for monitoring. As another example, other types of processing in addition to or instead of the SPM blocks 112 and 114 could be utilized. For example, the process variable data could be filtered, trimmed, etc., prior to the SPM blocks 112 and 114, or rather than utilizing the SPM blocks 112 and 114.

Additionally, although the model 116 is illustrated as having a single independent load variable input (x), a single dependent temperature difference variable input (y), and a single predicted value ($y_P$), the model 116 could include a regression model that models multiple temperature difference variables as a function of multiple load variables. For example, the model 116 could comprise a multiple linear regression (MLR) model, a principal component regression (PCR) model, a partial least squares (PLS) model, a ridge regression (RR) model, a variable subset selection (VSS) model, a support vector machine (SVM) model, etc.

The AOD system 100 could be implemented wholly or partially in a hydrocracker reactor 64, 66 or a device of the reactor 64, 66 or hydrocracker. As just one example, the SPM blocks 112 and 114 could be implemented in a temperature sensor or temperature transmitter of the reactor 64 and the model 116 and/or the deviation detector 118 could be implemented in the controller 60 or some other device. In one particular implementation, the AOD system 100 could be implemented as a function block, such as a function block to be used in system that implements a Fieldbus protocol. Such a function block may or may not include the SPM blocks 112 and 114. In another implementation, each of at least some of the blocks 108, 110, 112, 114, 116 and 118 may be implemented as a function block. For example, the blocks 112, 114, 116, 118 may be implemented as function blocks of a regression function block 108. However, the functions of each blocks may be distributed in a variety of manners. For example, the regression model 116 may provide the output ($y_P$) to the deviation detector 118, rather than the deviation detector 118 executing the regression model 116 to provide the prediction of the temperature difference variable ($y_P$). In this implementation, after it has been trained, the model 116 may be used to generate a predicted value ($y_P$) of the monitored temperature difference variable value (y) based on a given independent load variable input (x). The output ($y_P$) of the model 116 is provided to the deviation detector 118. The deviation detector 118 receives the output ($y_P$) of the regression model 116 as well as the dependent variable input (y) to the model 116. As above, the deviation detector 118 compares the monitored dependent temperature difference variable (y) to the value ($y_P$) generated by the model 116 to determine if the dependent temperature difference variable value (y) is significantly deviating from the predicted temperature difference value ($y_P$).

The AOD system 100 may be in communication with the abnormal situation prevention system 35 (FIGS. 1 and 2A). For example, the AOD system 100 may be in communication with the configuration application 38 to permit a user to configure the AOD system 100. For instance, one or more of the SPM blocks 112 and 114, the model 116, and the deviation detector 118 may have user configurable parameters that may be modified via the configuration application 38.

Additionally, the AOD system 100 may provide information to the abnormal situation prevention system 35 and/or other systems in the process plant. For example, the deviation indicator generated by the deviation detector 118 or by the status decision block 110 could be provided to the abnormal situation prevention system 35 and/or the alert/alarm application 43 to notify an operator of the abnormal condition. As another example, after the model 116 has been trained, parameters of the model could be provided to the abnormal situation prevention system 35 and/or other systems in the process plant so that an operator can examine the model and/or so that the model parameters can be stored in a database. As yet another example, the AOD system 100 may provide (x), (y), and/or ($y_P$) values to the abnormal situation prevention system 35 so that an operator can view the values, for instance, when a deviation has been detected.

Figure 4:
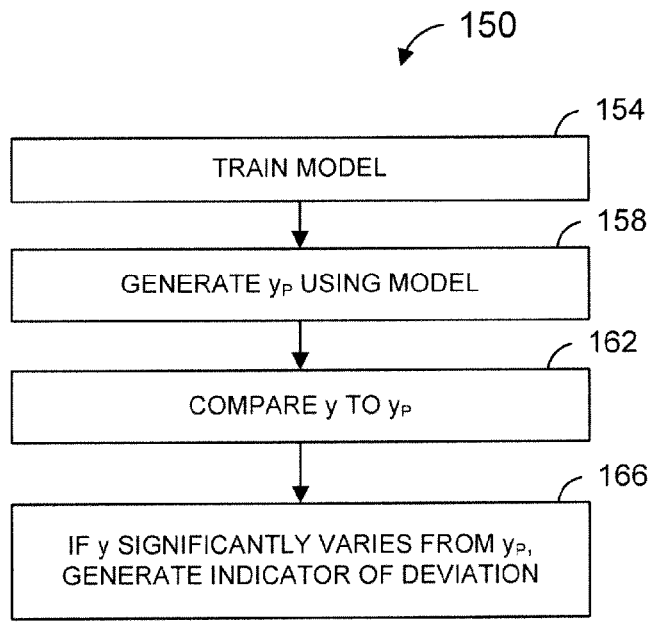
FIG. 4 is flow diagram of an example method that may be implemented using the example AOD system of FIGS. 3A and 3B.

FIG. 4 is a flow diagram of an example method 150 for detecting an abnormal operation in the hydrocracker or, more particularly, in one or more of the reactors of the hydrocracker. The method 150 could be implemented using the example AOD system 100 of FIGS. 3A and 3B and will be used to explain the operation of the AOD system 100. However, one of ordinary skill in the art will recognize that the method 150 could be implemented by a system different than the AOD system 100. At a block 154, a model, such as the model 116, is trained. For example, the model could be trained using the independent load variable X and the dependent temperature difference variable Y data sets to configure it to model the temperature difference variable as a function of the load variable. The model could include multiple regression models that each model the temperature difference variable as a function of the load variable for a different range of the load variable.

Then, at a block 158, the trained model generates predicted values ($y_P$) of the dependent temperature difference variable Y using values (x) of the independent load variable X that it receives. Next, at a block 162, the monitored values (y) of the temperature difference variable are compared to the corresponding predicted values ($y_P$) to determine if the temperature difference is significantly deviating from the predicted temperature difference. For example, the deviation detector 118 generates or receives the output ($y_P$) of the model 116 and compares it to the value (y) of the monitored temperature difference variable. If it is determined that the monitored temperature difference variable has significantly deviated from ($y_P$) an indicator of the deviation may be generated at a block 166. In the AOD system 100, for example, the deviation detector 118 may generate the indicator. The indicator may be an alert or alarm, for example, or any other type of signal, flag, message, etc., indicating that a significant deviation has been detected (e.g., status="Up").

As will be discussed in more detail below, the block 154 may be repeated after the model has been initially trained and after it has generated predicted values ($y_P$) of the dependent temperature difference variable Y. For example, the model could be retrained if a set point in the process has been changed or if a value of the independent load variable falls outside of the range $x_{MIN}$, $x_{MAX}$.

Overview of the Model

Figure 5:
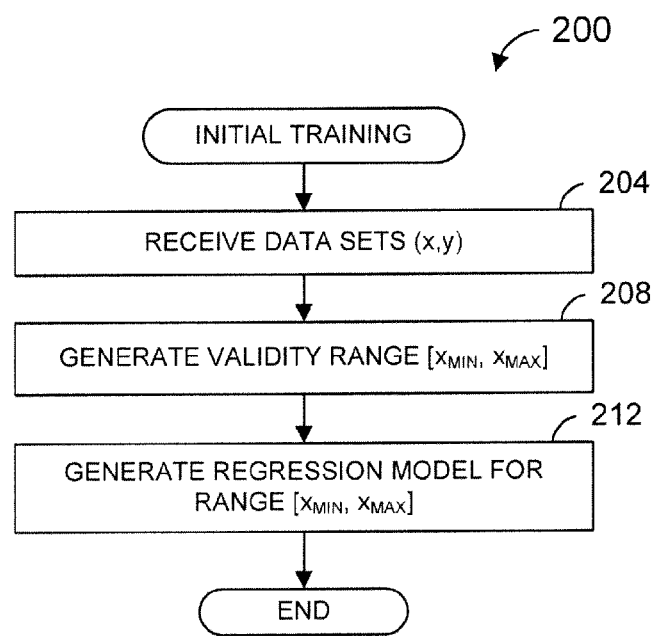
FIG. 5 is a flow diagram of an example method for initially training the model of FIGS. 3A and 3B.
Figure 6A:
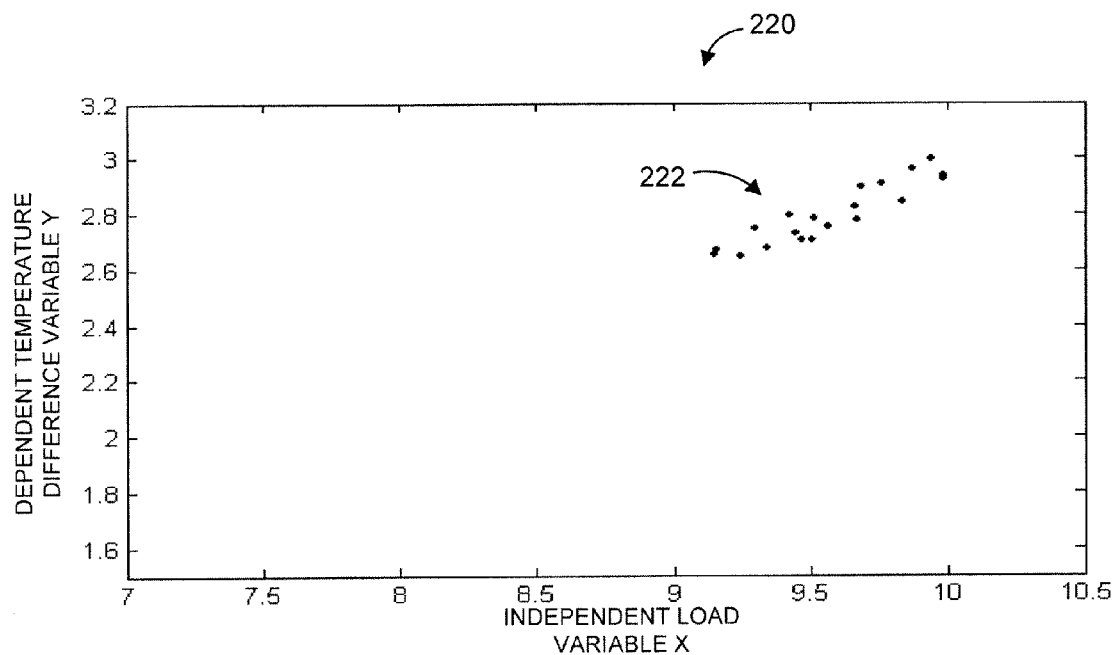
FIG. 6A is a graph showing a plurality of data sets that may be collected during a LEARNING state an AOD system and used by the model of FIG. 3B to develop a regression model.

FIG. 5 is a flow diagram of an example method 200 for initially training a model such as the model 116 of FIG. 3B. The training of the model 116 may be referred to as a LEARNING state, as described further below. At a block 204, at least an adequate number of data sets (x, y) for the independent load variable X and the dependent temperature difference variable Y may be received in order to train a model. As described above, the data sets (x, y) may comprise temperature difference and load variable data, temperature difference and load variable data that has been filtered or otherwise processed, statistical data generated from the temperature difference and load variable data, etc. In the AOD system of FIGS. 3A and 3B, the model 116 may receive data sets (x, y) from the SPM blocks 112 and 114. Referring now to FIG. 6A, a graph 220 shows an example of a plurality of data sets (x, y) received by a model, and illustrating the AOD system in the LEARNING state while the model is being initially trained. In particular, the graph 220 of FIG. 6A includes a group 222 of data sets that have been collected.

Referring again to FIG. 5, at a block 208, a validity range [$x_{MIN}$, $x_{MAX}$] for the model may be generated. The validity range may indicate a range of the independent load variable X for which the model is valid. For instance, the validity range may indicate that the model is valid only for load variable X values in which (x) is greater than or equal to $x_{MIN}$ and less than or equal to $x_{MAX}$. As just one example, $x_{MIN}$ could be set as the smallest value of the load variable in the data sets (x, y) received at the block 204, and $x_{MAX}$ could be set as the largest value of the load variable in the data sets (x, y) received at the block 204. Referring again to FIG. 6A, $x_{MIN}$ could be set to the load variable value of the leftmost data set, and $x_{MAX}$ could be set as the load variable value of the rightmost data set, for example. Of course, the determination of validity range could be implemented in other ways as well. In the AOD system 100 of FIGS. 3A and 3B, the model block 116 could generate the validity range.

Figure 6B:
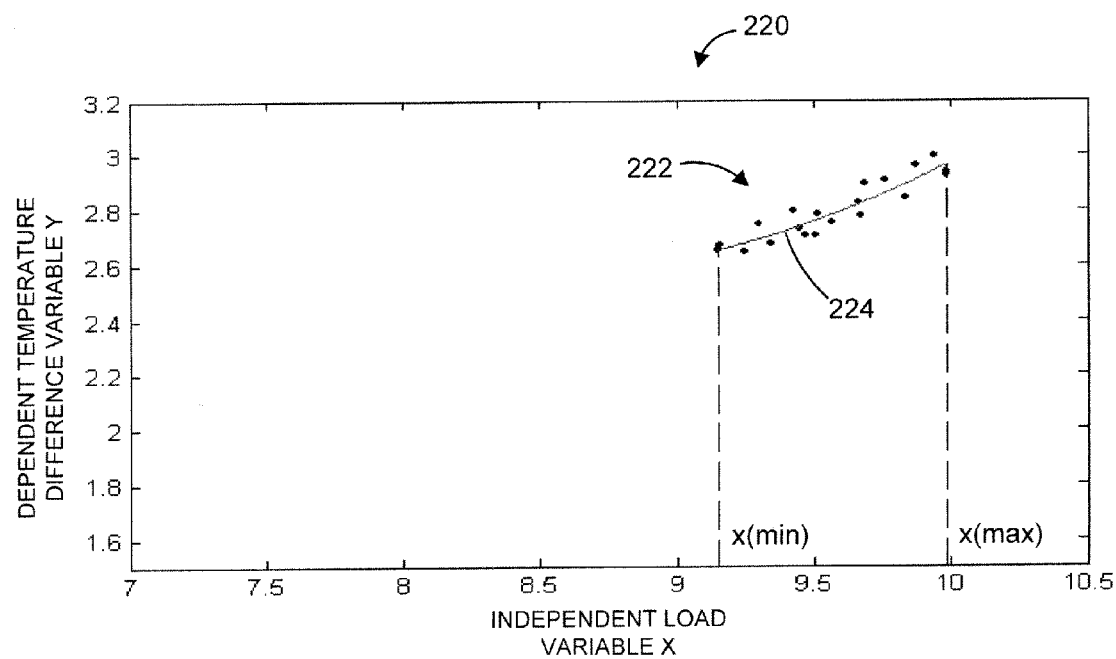
FIG. 6B is a graph showing an initial regression model developed using the plurality of data sets of FIG. 6A.

At a block 212, a regression model for the range [$x_{MIN}$, $x_{MAX}$] may be generated based on the data sets (x, y) received at the block 204. In an example described further below, after a MONITOR command is issued, or if a maximum number of data sets has been collected, a regression model corresponding to the group 222 of data sets may be generated. Any of a variety of techniques, including known techniques, may be used to generate the regression model, and any of a variety of functions could be used as the model. For example, the model of could comprise a linear equation, a quadratic equation, a higher order equation, etc. The graph 220 of FIG. 6B includes a curve 224 superimposed on the data sets (x, y) received at the block 204 illustrates a regression model corresponding to the group 222 of data sets to model the data sets (x, y). The regression model corresponding to the curve 224 is valid in the range [$x_{MIN}$, $x_{MAX}$]. In the AOD system 100 of FIGS. 3A and 3B, the model block 116 could generate the regression model for the range [$x_{MIN}$, $x_{MAX}$]

Utilizing the Model through Operating Region Changes

Figure 7:
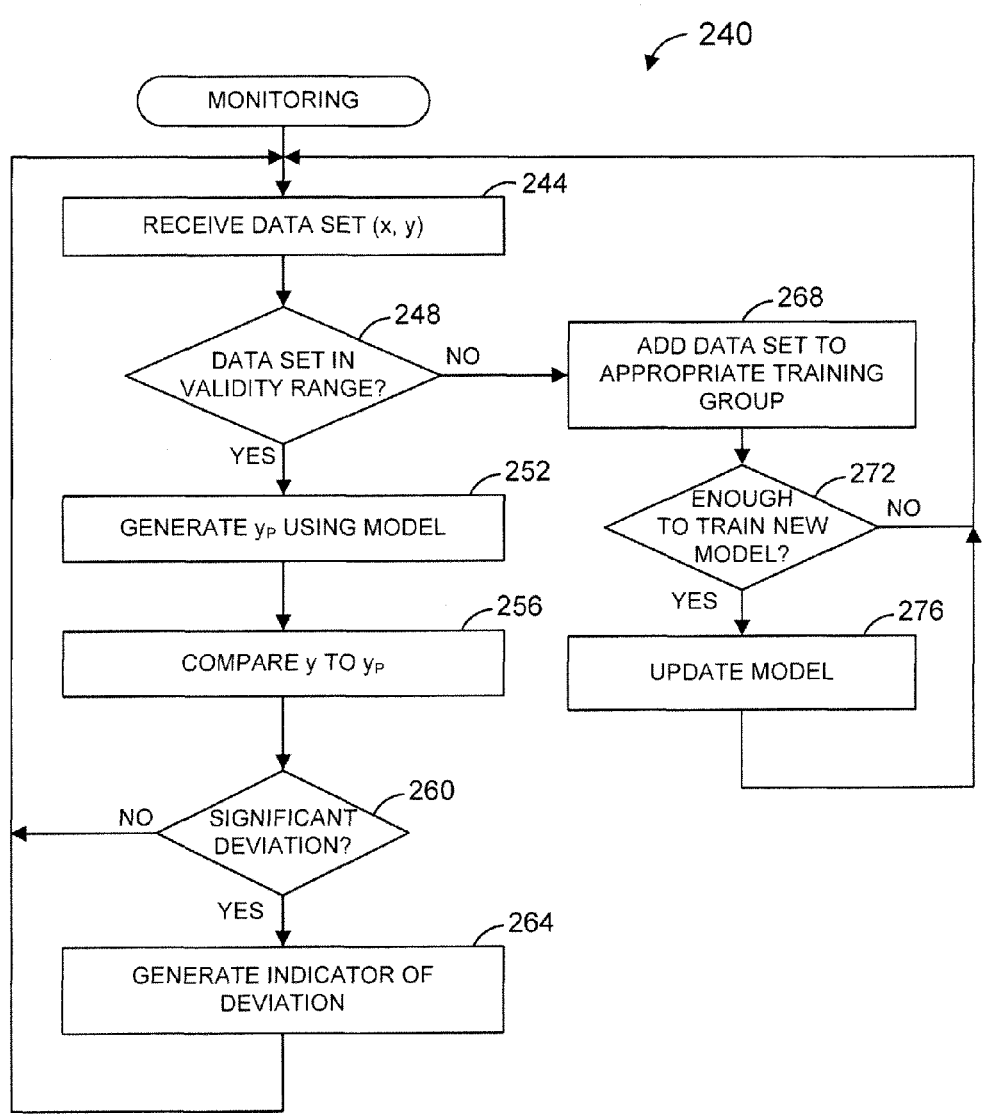
FIG. 7 is a flow diagram of an example method that may be implemented using the example abnormal operation detection system of FIGS. 3A and 3B.

It may be that, after the model has been initially trained, the system that it models may move into a different, but normal operating region. For example, a set point may be changed. FIG. 7 is a flow diagram of an example method 240 for using a model to determine whether abnormal operation is occurring, has occurred, or may occur, wherein the model may be updated if the modeled process moves into a different operating region. The method 240 may be implemented by an AOD system such as the AOD system 100 of FIGS. 3A and 3B. Of course, the method 240 could be implemented by other types of AOD systems as well. The method 240 may be implemented after an initial model has been generated. The method 200 of FIG. 5, for example, could be used to generate the initial model.

At a block 244, a data set (x, y) is received. In the AOD system 100 of FIGS. 3A and 3B, the model 116 could receive a data set (x, y) from the SPM blocks 112 and 114, for example. Then, at a block 248, it may be determined whether the data set (x, y) received at the block 244 is in a validity range. The validity range may indicate a range in which the model is valid. In the AOD system 100 of FIGS. 3A and 3B, the model 116 could examine the load variable value (x) received at the block 244 to determine if it is within the validity range [$x_{MIN}$, $x_{MAX}$]. If it is determined that the data set (x, y) received at the block 244 is in the validity range, the flow may proceed to a block 252.

At the block 252, a predicted temperature difference variable value ($y_P$) of the dependent temperature difference variable Y may be generated using the model. In particular, the model generates the predicted temperature difference variable value ($y_P$) from the load variable value (x) received at the block 244. In the AOD system 100 of FIGS. 3A and 3B, the model 116 generates the predicted temperature difference variable value ($y_P$) from the load variable value (x) received from the SPM block 112.

Figure 8A:
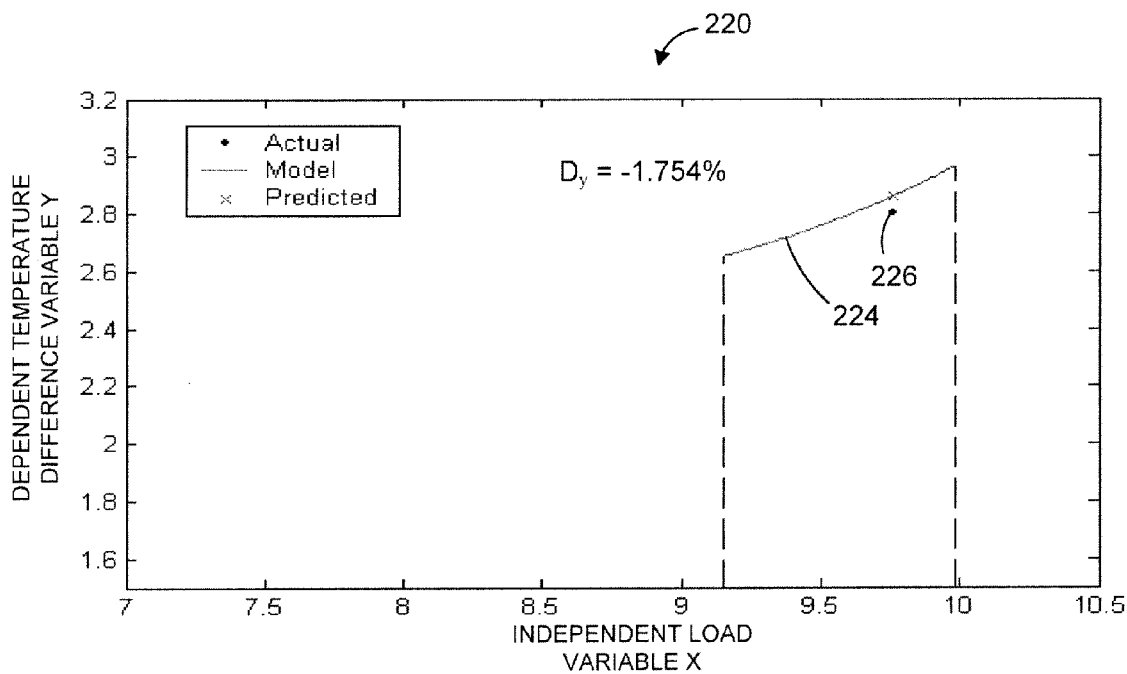
FIG. 8A is a graph showing a received data set and a corresponding predicted value generated during a MONITORING state of an AOD system by the model of FIG. 3B.
Figure 8B:
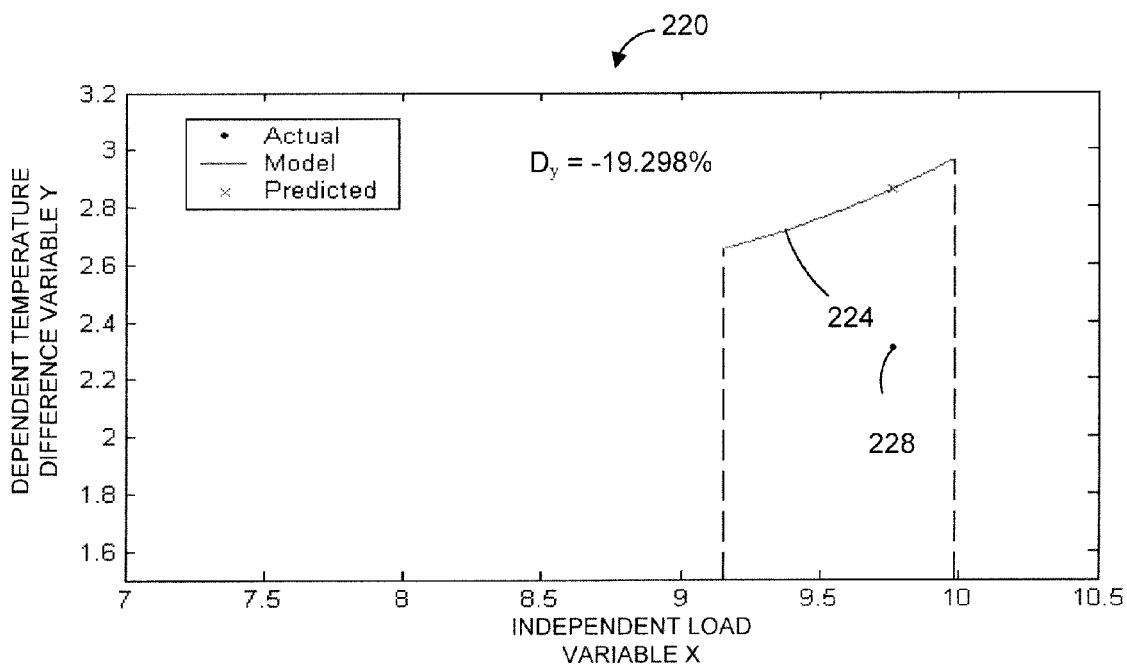
FIG. 8B is a graph showing another received data set and another corresponding predicted value generated by the model of FIG. 3B.

Then, at a block 256, the monitored temperature difference variable value (y) received at the block 244 may be compared with the predicted temperature difference value ($y_P$). The comparison may be implemented in a variety of ways. For example, a difference or a percentage difference could be generated. Other types of comparisons could be used as well. Referring now to FIG. 8A, an example received data set is illustrated in the graph 220 as a dot 226, and the corresponding predicted value, ($y_P$), is illustrated as an "x". The graph 220 of FIG. 8A illustrates operation of the AOD system in the MONITORING state. The model generates the prediction ($y_P$) using the regression model indicated by the curve 224. As illustrated in FIG. 8A, it has been calculated that the difference between the monitored temperature difference variable value (y) received at the block 244 and the predicted temperature difference value ($y_P$) is −1.754%. Referring now to FIG. 8B, another example received data set is illustrated in the graph 220 as a dot 228, and the corresponding predicted temperature difference variable value, ($y_P$), is illustrated as an "x". As illustrated in FIG. 8B, it has been calculated that the difference between the monitored temperature difference variable value (y) received at the block 244 and the predicted value ($y_P$) is −19.298%. In the AOD system 100 of FIGS. 3A and 3B, the deviation detector 118 may perform the comparison.

Referring again to FIG. 7, at a block 260, it may be determined whether the monitored temperature difference value (y) received at the block 244 significantly deviates from the predicted temperature difference variable value ($y_P$) based on the comparison of the block 256. The determination at the block 260 may be implemented in a variety of ways and may depend upon how the comparison of the block 256 was implemented. For example, if a temperature difference value was generated at the block 256, it may be determined whether this difference value exceeds some threshold. The threshold may be a predetermined or configurable value. Also, the threshold may be constant or may vary. For example, the threshold may vary depending upon the value of the independent load variable X value received at the block 244. As another example, if a percentage difference value was generated at the block 256, it may be determined whether this percentage value exceeds some threshold percentage, such as by more than a certain percentage of the predicted temperature difference variable value ($y_P$). As yet another example, a significant deviation may be determined only if two or some other number of consecutive comparisons exceed a threshold. As still another example, a significant deviation may be determined only if the monitored temperature difference variable value (y) exceeds the predicted temperature difference variable value ($y_P$) by more than a certain number of standard deviations of the predicted temperature difference variable value ($y_P$). The standard deviation(s) may be modeled as a function of the load variable X or calculated from the variable of the residuals of the training data. A common threshold may be used for each of the temperature difference variables ($\Delta T_1$-$\Delta T_{N-1}$) being monitored, or different thresholds may be used for some or all of the temperature difference variables.

Referring again to FIG. 8A, the difference between the monitored temperature difference variable value (y) received at the block 244 and the predicted temperature difference variable value ($y_P$) is −1.754%. If, for example, a threshold of 10% is to be used to determine whether a deviation is significant, the absolute value of the difference illustrated in FIG. 8A is below that threshold. Referring again to FIG. 8B on the other hand, the difference between the monitored temperature difference variable value (y) received at the block 244 and the predicted temperature difference variable value ($y_P$) is −19.298%. The absolute value of the difference illustrated in FIG. 8B is above the threshold value 10% so an abnormal condition indicator may be generated as will be discussed below. In the AOD system 100 of FIGS. 3A and 3B, the deviation detector 118 may implement the block 260.

In general, determining if the monitored temperature difference variable value (y) significantly deviates from the predicted temperature difference variable value ($y_P$) may be implemented using a variety of techniques, including known techniques. In one implementation, determining if the monitored temperature difference variable value (y) significantly deviates from the predicted temperature difference value ($y_P$) may include analyzing the present values of (y) and ($y_P$). For example, the monitored temperature difference variable value (y) could be subtracted from the predicted temperature difference variable value ($y_P$), or vice versa, and the result may be compared to a threshold to see if it exceeds the threshold. It may optionally comprise also analyzing past values of (y) and ($y_P$). Further, it may comprise comparing (y) or a difference between (y) and ($y_P$) to one or more thresholds. Each of the one or more thresholds may be fixed or may change. For example, a threshold may change depending on the value of the load variable X or some other variable. Different thresholds may be used for different temperature difference variables ($\Delta T_1$, ..., $\Delta T_{1-N}$). U.S. patent application Ser. No. 11/492,347, entitled "Methods And Systems For Detecting Deviation Of A Process Variable From Expected Values," filed on Jul. 25, 2006, and which was incorporated by reference above, describes example systems and methods for detecting whether a process variable significantly deviates from an expected value, and any of these systems and methods may optionally be utilized. One of ordinary skill in the art will recognize many other ways of determining if the monitored temperature difference variable value (y) significantly deviates from the predicted temperature difference variable value ($y_P$). Further, blocks 256 and 260 may be combined.

Some or all of criteria to be used in the comparing (y) to ($y_P$) (block 256) and/or the criteria to be used in determining if (y) significantly deviates from ($y_P$) (block 260) may be configurable by a user via the configuration application 38 (FIGS. 1 and 2A) for example. For instance, the type of comparison (e.g., generate difference, generate absolute value of difference, generate percentage difference, etc.) may be configurable. Also, the threshold or thresholds to be used in determining whether the deviation is significant may be configurable by an operator or by another algorithm. Alternatively, such criteria may not be readily configurable.

Referring again to FIG. 7, if it is determined that the monitored temperature difference variable value (y) received at the block 244 does not significantly deviate from the predicted value ($y_P$), the flow may return to the block 244 to receive the next data set (x, y). If however, it is determined that the temperature difference variable value (y) does significantly deviate from the predicted value ($y_P$), the flow may proceed to the block 264. At the block 264, an indicator of a deviation may be generated. The indicator may be an alert or alarm, for example. The generated indicator may include additional information such as whether the value (y) received at the block 244 was higher than expected or lower than expected, for example. Referring to FIG. 8A, because the difference between the temperature difference variable value (y) received at the block 244 and the predicted value ($y_P$) is −1.754%, which is below the threshold 10%, no indicator is generated. On the other hand, referring to FIG. 8B, the difference between (y) received at the block 244 and the predicted value ($y_P$) is −19.298%, which is above the threshold 10%. Therefore, an indicator is generated. In the AOD system 100 of FIGS. 3A and 3B, the deviation detector 118 may generate the indicator.

Referring again to the block 248 of FIG. 7, if it is determined that the data set (x, y) received at the block 244 is not in the validity range, the flow may proceed to a block 268. However, the models developed by the AOD system are generally valid for the range of data for which the model was trained. If the load variable X goes outside of the limits for the model as illustrated by the curve 224, the status is out of range, and the AOD system would be unable to detect the abnormal condition. For example, in FIG. 8C, the AOD system receives a data set illustrated as a dot 230 that is not within the validity range. This may cause the AOD system to transition to an OUT OF RANGE state, in which case, the AOD system may transition again to the LEARNING state, either in response to an operator command or automatically. As such, after the initial learning period, if the process moves to a different operating region, it remains possible for the AOD system to learn a new model for the new operating region while keeping the model for the original operating range.

Figure 9A:
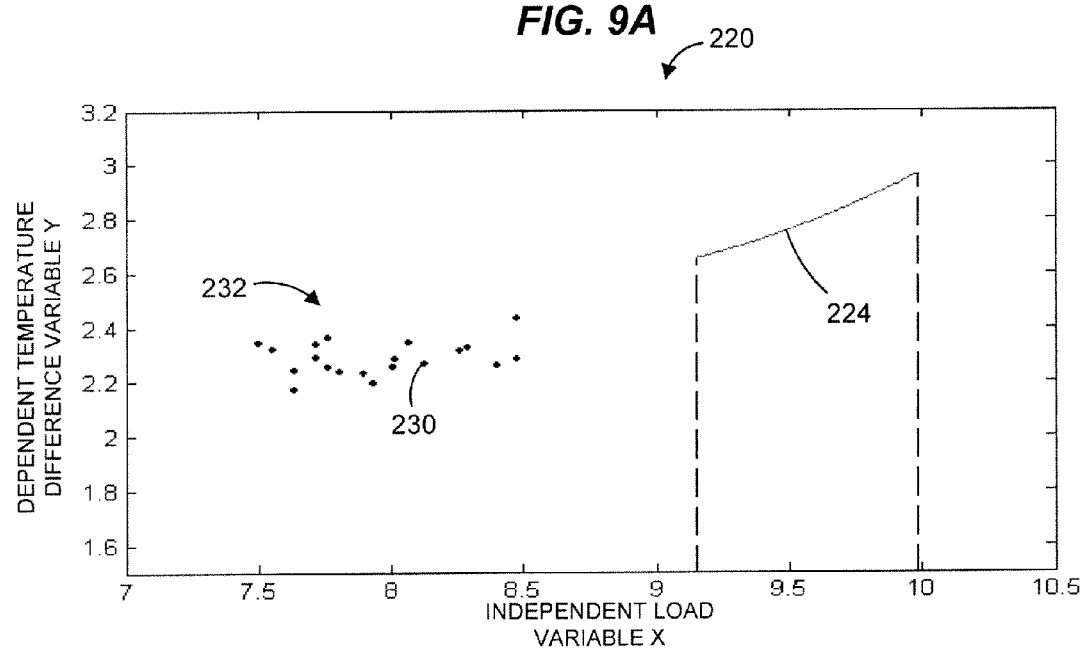
FIG. 9A is a graph showing a plurality of data sets in different operating region collected during a LEARNING state of an AOD system and that may be used by the model of FIG. 3 to develop a second regression model in a different operating region.

Referring now to FIG. 9A, it shows a graph further illustrating received data sets 232 that are not in the validity range when the AOD system transitions back to a LEARNING state. In particular, the graph of FIG. 9A includes a group 232 of data sets that have been collected. Referring again to FIG.

7, at the block 268, the data set (x, y) received at the block 244 may be added to an appropriate group of data sets that may be used to train the model at a subsequent time. Referring to FIG. 9A, the data set 230 has been added to the group of data sets 232 corresponding to data sets in which the value of X is less than $x_{MIN}$. For example, if the value of the load variable X received at the block 244 is less than $x_{MIN}$, the data set (x, y) received at the block 244 may be added to a data group corresponding to other received data sets in which the value of the load variable X is less than $x_{MIN}$. Similarly, if the value of the load variable value X received at the block 244 is greater than $x_{MAX}$, the data set (x, y) received at the block 244 may be added to a data group corresponding to other received data sets in which the value of the load variable value is greater than $x_{MAX}$. In the AOD system 100 of FIGS. 3A and 3B, the model block 116 may implement the block 268.

Then, at a block 272, it may be determined if enough data sets are in the data group, to which the data set was added at the block 268 in order to generate a regression model corresponding to the group 232 of data sets. This determination may be implemented using a variety of techniques. For example, the number of data sets in the group may be compared to a minimum number, and if the number of data sets in the group is at least this minimum number, it may be determined that there are enough data sets in order to generate a regression model. The minimum number may be selected using a variety of techniques, including techniques known to those of ordinary skill in the art. If it is determined that there are enough data sets in order to generate a regression model, the model may be updated at a block 276, as will be described below with reference to FIG. 10. If it is determined, however, that there are not enough data sets in order to generate a regression model, the flow may return to the block 244 to receive the next data set (x, y). In another example, an operator may cause a MONITOR command to be issued in order to cause the regression model to be generated.

Figure 10:
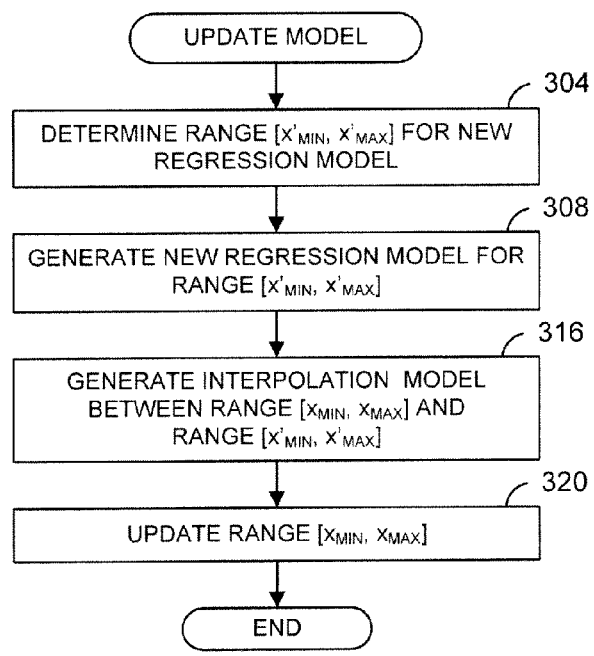
FIG. 10 is a flow diagram of an example method for updating the model of FIG. 3B.

FIG. 10 is a flow diagram of an example method 276 for updating the model after it is determined that there are enough data sets in a group in order to generate a regression model for data sets outside the current validity range [$x_{MIN}$, $x_{MAX}$]. At a block 304, a range [$x'_{MIN}$, $x'_{MAX}$] for a new regression model may be determined. The validity range may indicate a range of the independent load variable X for which the new regression model will be valid. For instance, the validity range may indicate that the model is valid only for load variable values (x) in which (x) is greater than or equal to X'MIN and less than or equal to $x'_{MAX}$. As just one example, $x'_{MIN}$ could be set as the smallest value of load variable X in the group of data sets (x, y), and $x'_{MAX}$ could be set as the largest value of load variable X in the group of data sets (x, y). Referring again to FIG. 9A, $x'_{MIN}$ could be set to the load variable value (x) of the leftmost data set in the group 232, and $x'_{MAX}$ could be set as the load variable value (x) of the rightmost data set in the group 232, for example. In the AOD system 100 of FIGS. 3A and 3B, the model block 116 could generate the validity range.

Figure 9B:
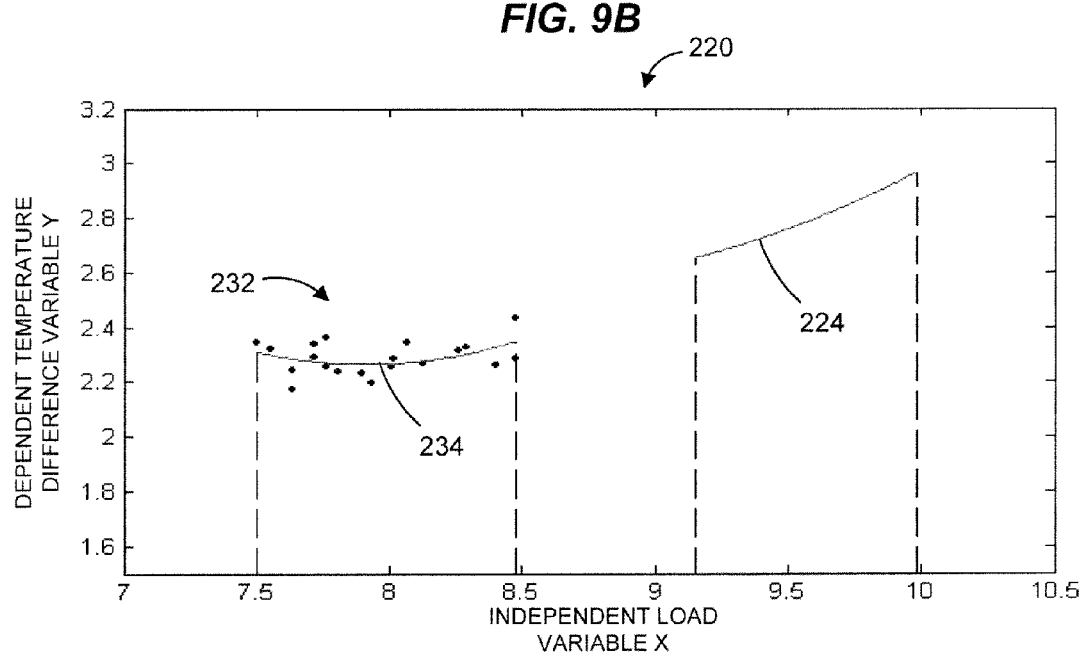
FIG. 9B is a graph showing a second regression model developed using the plurality of data sets of FIG. 9A.

At a block 308, a regression model for the range [$X'_{MIN}$, $x'_{MAX}$] may be generated based on the data sets (x, y) in the group. Any of a variety of techniques, including known techniques, may be used to generate the regression model, and any of a variety of functions could be used as the model. For example, the model could comprise a linear equation, a quadratic equation, etc. In FIG. 9B, a curve 234 superimposed on the group 232 illustrates a regression model that has been generated to model the data sets in the group 232. The regression model corresponding to the curve 234 is valid in the range [$X'_{MIN}$, $x'_{MAX}$], and the regression model corresponding to the curve 224 is valid in the range [$x_{MIN}$, $x_{MAX}$]. In the AOD system 100 of FIGS. 3A and 3B, the model 116 could generate the regression model for the range [$X'_{MIN}$, $X'_{MAX}$].

For ease of explanation, the range [$x_{MIN}$, $x_{MAX}$] will now be referred to as [$x_{MIN\_1}$, $x_{MAX\_1}$], and the range [$x'_{MIN}$, $x'_{MAX}$] will now be referred to as [$x_{MIN\_2}$, $x_{MAX\_2}$]. Additionally, the regression model corresponding to the range [$x_{MIN\_1}$, $x_{MAX\_1}$] will be referred to as $f_1(x)$, and regression model corresponding to the range [$x_{MIN\_2}$, $x_{MAX\_2}$] will be referred to as $f_2(x)$. Thus, the model may now be represented as:

$$f(x) = \begin{cases} f_1(x) & \text{for } x_{MIN\_1} \le x \le x_{MAX\_1} \\ f_2(x) & \text{for } x_{MIN\_2} \le x \le x_{MAX\_2} \end{cases} \quad \text{(Equ. 1)}$$

Referring again to FIG. 10, at a block 316, an interpolation model may be generated between the regression models corresponding to the ranges [$x_{MIN\_1}$, $x_{MAX\_1}$] and [$x_{MIN\_2}$, $x_{MAX\_2}$] for the operating region between the curves 224 and 234. The interpolation model described below comprises a linear function, but in other implementations, other types of functions, such as a quadratic function, can be used. If $x_{MAX\_1}$ is less than $x_{MIN\_2}$, then the interpolation model may be calculated as:

$$\left(\frac{f_2(x_{MIN\_2}) - f_1(x_{MAX\_1})}{x_{MIN\_2} - x_{MAX\_1}}\right)(x - x_{MIN\_2}) + f_2(x_{MIN\_2}) \quad \text{(Equ. 2)}$$

Similarly, if $x_{MAX\_2}$ is less than $x_{MIN\_1}$, then the interpolation model may be calculated as:

$$\left(\frac{f_1(x_{MIN\_1}) - f_2(x_{MAX\_2})}{x_{MIN\_1} - x_{MAX\_2}}\right)(x - x_{MIN\_1}) + f_1(x_{MIN\_1}) \quad \text{(Equ. 3)}$$

Thus, the model may now be represented as:

$$f(x) = \begin{cases} f_1(x) & \text{for } x_{MIN\_1} \le x \le x_{MAX\_1} \\ \left(\frac{f_2(x_{MIN\_2}) - f_1(x_{MAX\_1})}{x_{MIN\_2} - x_{MAX\_1}}\right)(x - x_{MIN\_2}) + f_2(x_{MIN\_2}) & \text{for } x_{MAX\_1} < x < x_{MIN\_2} \\ f_2(x) & \text{for } x_{MIN\_2} \le x \le x_{MAX\_2} \end{cases} \quad \text{(Equ. 4)}$$

if $x_{MAX\_1}$ is less than $x_{MIN\_2}$. And, if $x_{MAX\_2}$ is less than $x_{MIN\_1}$, the interpolation model may be represented as:

$$f(x) = \begin{cases} f_2(x) & \text{for } x_{MIN\_2} \leq x \leq x_{MAX\_2} \\ \left( \frac{f_1(x_{MIN\_1}) - f_2(x_{MAX\_2})}{x_{MIN\_1} - x_{MAX\_2}} \right)(x - x_{MIN\_1}) + f_1(x_{MIN\_1}) & \text{for } x_{MAX\_2} < x < x_{MIN\_1} \\ f_1(x) & \text{for } x_{MIN\_1} \leq x \leq x_{MAX\_1} \end{cases} \quad \text{(Equ. 5)}$$

As can be seen from equations 1, 4 and 5, the model may comprise a plurality of regression models. In particular, a first regression model (i.e., $f_1(x)$) may be used to model the dependent temperature difference variable Y in a first operating region (i.e., $x_{MIN\_1} \leq x \leq x_{MAX\_1}$), and a second regression model (i.e., $f_2(x)$) may be used to model the dependent temperature difference variable Y in a second operating region (i.e., $x_{MIN\_2} \leq x \leq x_{MAX\_2}$). Additionally, as can be seen from equations 4 and 5, the model may also comprise an interpolation model to model the dependent temperature difference variable Y in between operating regions corresponding to the regression models.

Figure 9C:
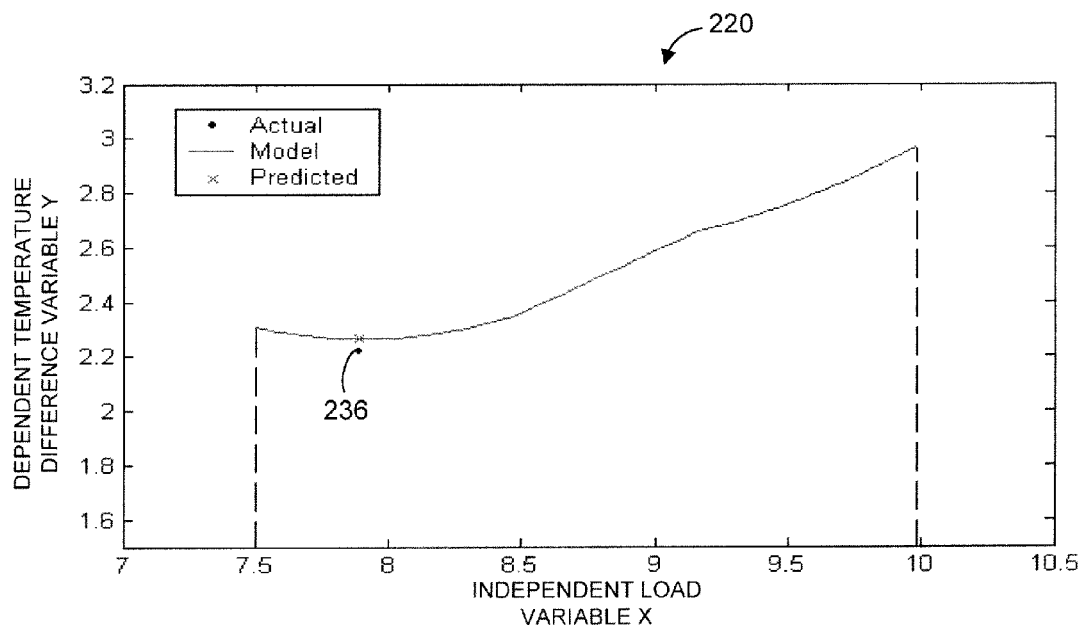
FIG. 9C is a graph showing an updated model and its range of validity, and also showing a received data set and a corresponding predicted value generated during a MONITORING state of an AOD system.

Referring again to FIG. 10, at a block 320, the validity range may be updated. For example, if $x_{MAX\_1}$ is less than $x_{MIN\_2}$, then $x_{MIN}$ may be set to $x_{MIN\_1}$ and $x_{MAX}$ may be set to $x_{MAX\_2}$. Similarly, if $x_{MAX\_2}$ is less than $x_{MIN\_1}$, then $x_{MIN}$ may be set to $x_{MIN\_2}$ and $x_{MAX}$ may be set to $x_{MAX\_1}$. FIG. 9C illustrates the new model with the new validity range. Referring to FIGS. 7 and 10, the model may be updated a plurality of times using a method such as the method 276. As seen from FIG. 9C, the original model is retained for the original operating range, because the original model represents the "normal" value for the temperature difference variable Y. Otherwise, if the original model were continually updated, there is a possibility that the model would be updated to a faulty condition and an abnormal situation would not be detected. When the process moves into a new operation region, it may be assumed that the process is still in a normal condition in order to develop a new model, and the new model may be used to detect further abnormal situations in the system that occur in the new operating region. As such, the model for the hydrocracker may be extended indefinitely as the process model to different operating regions.

The abnormal situation prevention system 35 (FIGS. 1 and 2A) may cause, for example, graphs similar to some or all of the graphs illustrated in FIGS. 6A, 6B, 8A, 8B, 8C, 9A, 9B, 9C to be displayed on a display device. For instance, if the AOD system 100 provides model criteria data to the abnormal situation prevention system 35 or a database, for example, the abnormal situation prevention system 35 may use this data to generate a display illustrating how the model 116 is modeling the dependent temperature difference variable Y as a function of the independent load variable X. For example, the display may include a graph similar to one or more of the graphs of FIGS. 8A, 8B and 9C. Optionally, the AOD system 100 may also provide the abnormal situation prevention system 35 or a database, for example, with some or all of the data sets used to generate the model 116. In this case, the abnormal situation prevention system 35 may use this data to generate a display having a graph similar to one or more of the graphs of FIGS. 6A, 6B, 9A, 9B. Optionally, the AOD system 100 may also provide the abnormal situation prevention system 35 or a database, for example, with some or all of the data sets that the AOD system 100 is evaluating during its monitoring phase.

Additionally, the AOD system 100 may also provide the abnormal situation prevention system 35 or a database, for example, with the comparison data for some or all of the data sets. In this case, as just one example, the abnormal situation prevention system 35 may use this data to generate a display having a graph similar to one or more of the graphs of FIGS. 8A and 8B.

Manual Control of AOD System

In the AOD systems described with respect to FIGS. 5, 7 and 10, the model may automatically update itself when enough data sets have been obtained in a particular operating region. However, it may be desired that such updates do not occur unless a human operator permits it. Additionally, it may be desired to allow a human operator to cause the model to update even when received data sets are in the validity region.

Figure 11:
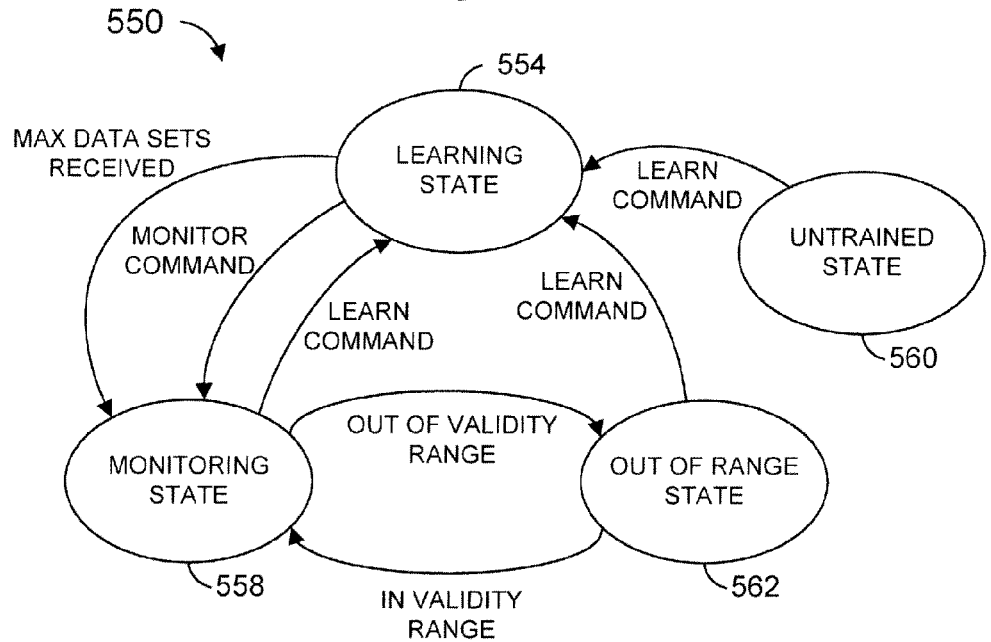
FIG. 11 is an example state transition diagram corresponding to an alternative operation of an AOD system such as the AOD systems of FIGS. 3A and 3B.

FIG. 11 is an example state transition diagram 550 corresponding to an alternative operation of an AOD system such as the AOD system 100 of FIGS. 3A and 3B. The operation corresponding to the state diagram 550 allows a human operator more control over the AOD system. For example, as will be described in more detail below, an operator may cause a LEARN command to be sent to the AOD system when the operator desires that the model of the AOD system be forced into a LEARNING state 554. Generally speaking, in the LEARNING state 554, which will be described in more detail below, the AOD system obtains data sets for generating a regression model. Similarly, when the operator desires that the AOD system create a regression model and begin monitoring incoming data sets, the operator may cause a MONITOR command to be sent to the AOD system. Generally speaking, in response to the MONITOR command, the AOD system may transition to a MONITORING state 558.

An initial state of the AOD system may be an UNTRAINED state 560, for example. The AOD system may transition from the UNTRAINED state 560 to the LEARNING state 554 when a LEARN command is received. If a MONITOR command is received, the AOD system may remain in the UNTRAINED state 560. Optionally, an indication may be displayed on a display device to notify the operator that the AOD system has not yet been trained.

In an OUT OF RANGE state 562, each received data set may be analyzed to determine if it is in the validity range. If the received data set is not in the validity range, the AOD system may remain in the OUT OF RANGE state 562. If, however, a received data set is within the validity range, the AOD system may transition to the MONITORING state 558. Additionally, if a LEARN command is received, the AOD system may transition to the LEARNING state 554.

In the LEARNING state 554, the AOD system may collect data sets so that a regression model may be generated in one or more operating regions corresponding to the collected data sets. Additionally, the AOD system optionally may check to see if a maximum number of data sets has been received. The maximum number may be governed by storage available to the AOD system, for example. Thus, if the maximum number of data sets has been received, this may indicate that the AOD system is, or is in danger of, running low on available memory for storing data sets, for example. In general, if it is determined that the maximum number of data sets has been received, or if a MONITOR command is received, the model of the AOD system may be updated and the AOD system may transition to the MONITORING state 558.

Figure 12:
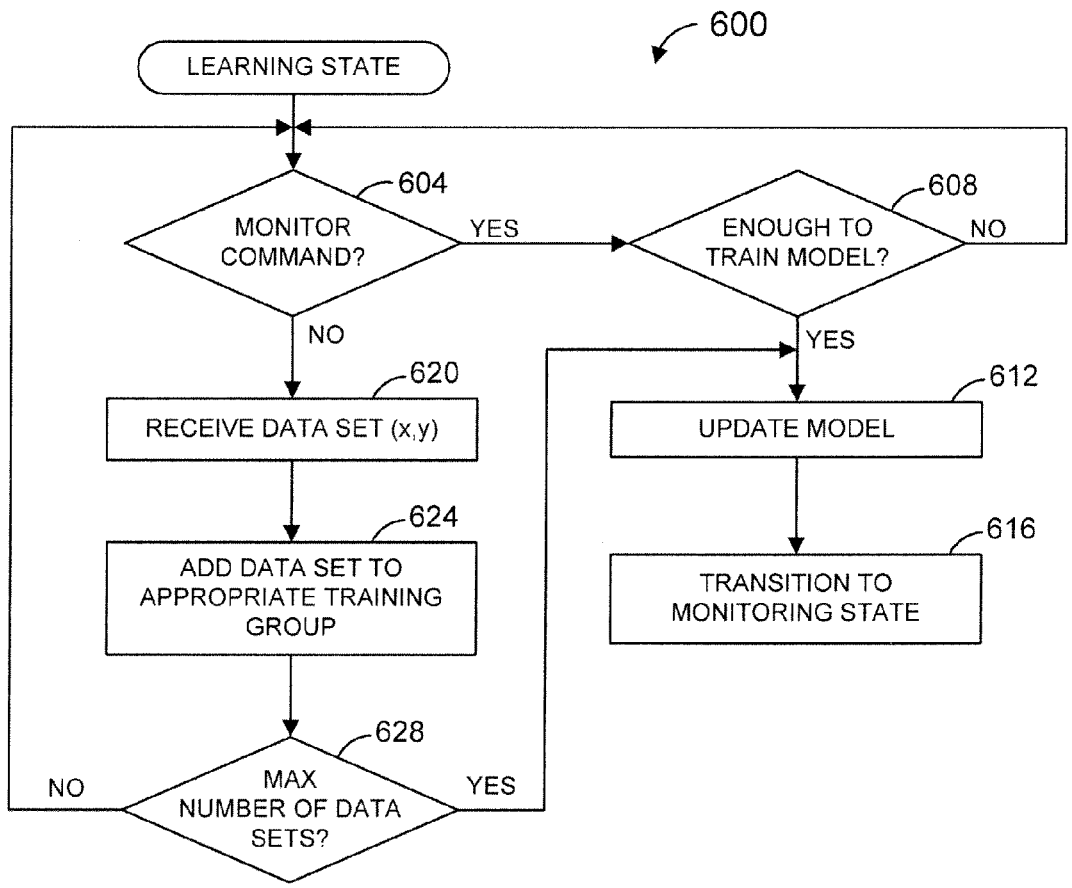
FIG. 12 is a flow diagram of an example method of operation in a LEARNING state of an AOD system.

FIG. 12 is a flow diagram of an example method 600 of operation in the LEARNING state 554. At a block 604, it may be determined if a MONITOR command was received. If a MONITOR command was received, the flow may proceed to a block 608. At the block 608, it may be determined if a minimum number of data sets has been collected in order to generate a regression model. If the minimum number of data sets has not been collected, the AOD system may remain in the LEARNING state 554. Optionally, an indication may be displayed on a display device to notify the operator that the AOD system is still in the LEARNING state because the minimum number of data sets has not yet been collected.

If, on the other hand, the minimum number of data sets has been collected, the flow may proceed to a block 612. At the block 612, the model of the AOD system may be updated as will be described in more detail with reference to FIG. 13. Next, at a block 616, the AOD system may transition to the MONITORING state 558.

If, at the block 604 it has been determined that a MONITOR command was not received, the flow may proceed to a block 620, at which a new data set may be received. Next, at a block 624, the received data set may be added to an appropriate training group. An appropriate training group may be determined based on the load variable value of the data set, for instance. As an illustrative example, if the load variable value is less than $x_{MIN}$ of the model's validity range, the data set could be added to a first training group. And, if the load variable value is greater than $x_{MAX}$ of the model's validity range, the data set could be added to a second training group.

At a block 628, it may be determined if a maximum number of data sets has been received. If the maximum number has been received, the flow may proceed to the block 612, and the AOD system will eventually transition to the MONITORING state 558 as described above. On the other hand, if the maximum number has not been received, the AOD system will remain in the LEARNING state 554. One of ordinary skill in the art will recognize that the method 600 can be modified in various ways. As just one example, if it is determined that the maximum number of data sets has been received at the block 628, the AOD system could merely stop adding data sets to a training group. Additionally or alternatively, the AOD system could cause a user to be prompted to give authorization to update the model. In this implementation, the model would not be updated, even if the maximum number of data sets had been obtained, unless a user authorized the update.

Figure 13:
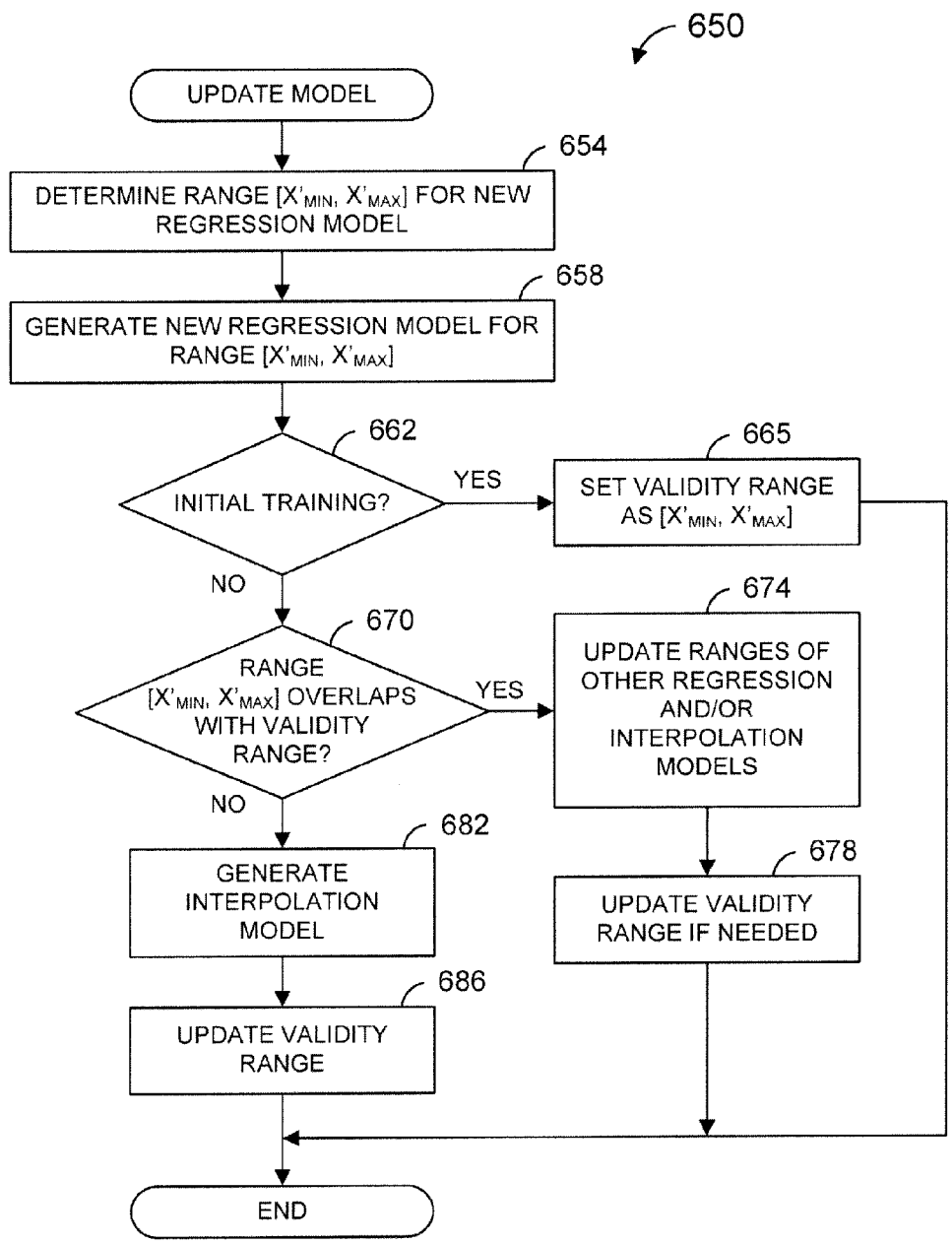
FIG. 13 is a flow diagram of an example method for updating a model of an AOD system.

FIG. 13 is a flow diagram of an example method 650 that may be used to implement the block 612 of FIG. 12. At a block 654, a range $[X'_{MIN}, x'_{MAX}]$ may be determined for the regression model to be generated using the newly collected data sets. The range $[X'_{MIN}, x'_{MAX}]$ may be implemented using a variety of techniques, including known techniques. At a block 658, the regression model corresponding to the range $[X'_{MIN}, x'_{MAX}]$ may be generated using some or all of the data sets collected and added to the training group as described with reference to FIG. 12. The regression model may be generated using a variety of techniques, including known techniques.

At a block 662, it may be determined if this is the initial training of the model. As just one example, it may be determined if the validity range $[x_{MIN}, x_{MAX}]$ is some predetermined range that indicates that the model has not yet been trained. If it is the initial training of the model, the flow may proceed to a block 665, at which the validity range $[x_{MIN}, x_{MAX}]$ will be set to the range determined at the block 654.

If at the block 662 it is determined that this is not the initial training of the model, the flow may proceed to a block 670. At the block 670, it may be determined whether the range $[X'_{MIN}, x'_{MAX}]$ overlaps with the validity range $[x_{MIN}, x_{MAX}]$. If there is overlap, the flow may proceed to a block 674, at which the ranges of one or more other regression models or interpolation models may be updated in light of the overlap. Optionally, if a range of one of the other regression models or interpolation models is completely within the range $[X'_{MIN}, x'_{MAX}]$, the other regression model or interpolation model may be discarded. This may help to conserve memory resources, for example. At a block 678, the validity range may be updated, if needed. For example, if $x'_{MIN}$ is less than $x_{MIN}$ of the validity range, $x_{MIN}$ of the validity range may be set to the $x'_{MIN}$.

If at the block 670 it is determined whether the range $[x'_{MIN}, x'_{MAX}]$ does not overlap with the validity range $[x_{MIN}, x_{MAX}]$, the flow may proceed to a block 682. At the block 682, an interpolation model may be generated, if needed. At the block 686, the validity range may be updated. The blocks 682 and 686 may be implemented in a manner similar to that described with respect to blocks 316 and 320 of FIG. 10.

One of ordinary skill in the art will recognize that the method 650 can be modified in various ways. As just one example, if it is determined that the range $[x'_{MIN}, x'_{MAX}]$ overlaps with the validity range $[x_{MIN}, x_{MAX}]$, one or more of the range $[x'_{MIN}, x'_{MAX}]$ and the operating ranges for the other regression models and interpolation models could be modified so that none of these ranges overlap.

Figure 14:
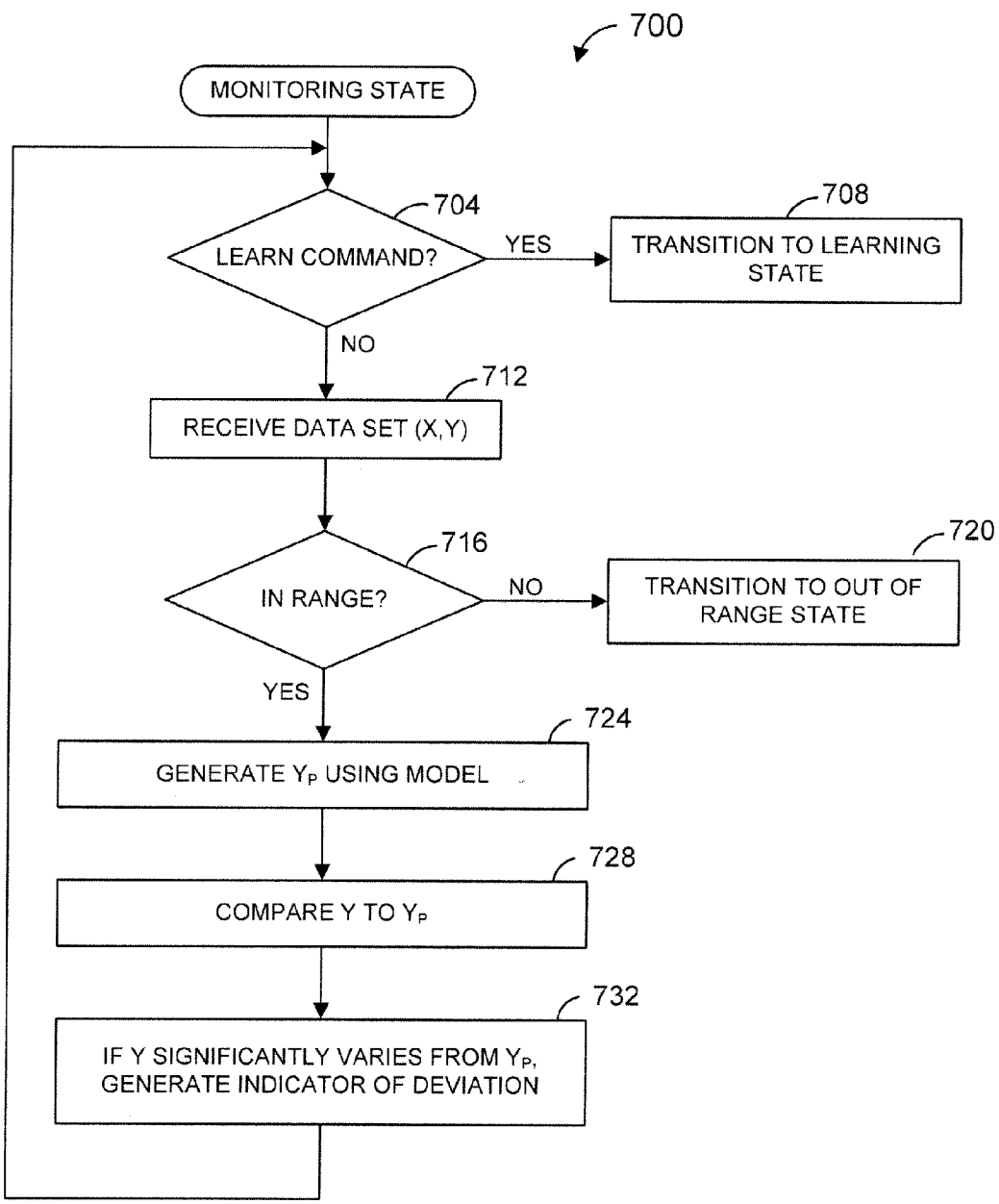
FIG. 14 is a flow diagram of an example method of operation in a MONITORING state of an AOD system.

FIG. 14 is a flow diagram of an example method 700 of operation in the MONITORING state 558. At a block 704, it may be determined if a LEARN command was received. If a LEARN command was received, the flow may proceed to a block 708. At the block 708, the AOD system may transition to the LEARNING state 554. If a LEARN command was not received, the flow may proceed to a block 712.

At the block 712, a data set (x, y) may be received as described previously. Then, at a block 716, it may be determined whether the received data set (x, y) is within the validity range $[x_{MIN}, x_{MAX}]$. If the data set is outside of the validity range $[x_{MIN}, x_{MAX}]$, the flow may proceed to a block 720, at which the AOD system may transition to the OUT OF RANGE state 562. But if it is determined at the block 716 that the data set is within the validity range $[x_{MIN}, x_{MAX}]$, the flow may proceed to blocks 724, 728 and 732. The blocks 724, 728 and 732 may be implemented similarly to the blocks 158, 162 and 166, respectively, as described with reference to FIG. 4.

To help further explain state transition diagram 550 of FIG. 11, the flow diagram 600 of FIG. 12, the flow diagram 650 of FIG. 13, and the flow diagram 700 of FIG. 14, reference is again made to FIGS. 6A, 6B, 8A, 8B, 8C, 9A, 9B, 9C. FIG. 6A shows the graph 220 illustrating the AOD system in the LEARNING state 554 while its model is being initially trained. In particular, the graph 220 of FIG. 6A includes the group 222 of data sets that have been collected. After an operator has caused a MONITOR command to be issued, or if a maximum number of data sets has been collected, a regression model corresponding to the group 222 of data sets may be generated. The graph 220 of FIG. 6B includes a curve 224 indicative of the regression model corresponding to the group 222 of data sets. Then, the AOD system may transition to the MONITORING state 558.

Figure 8C:
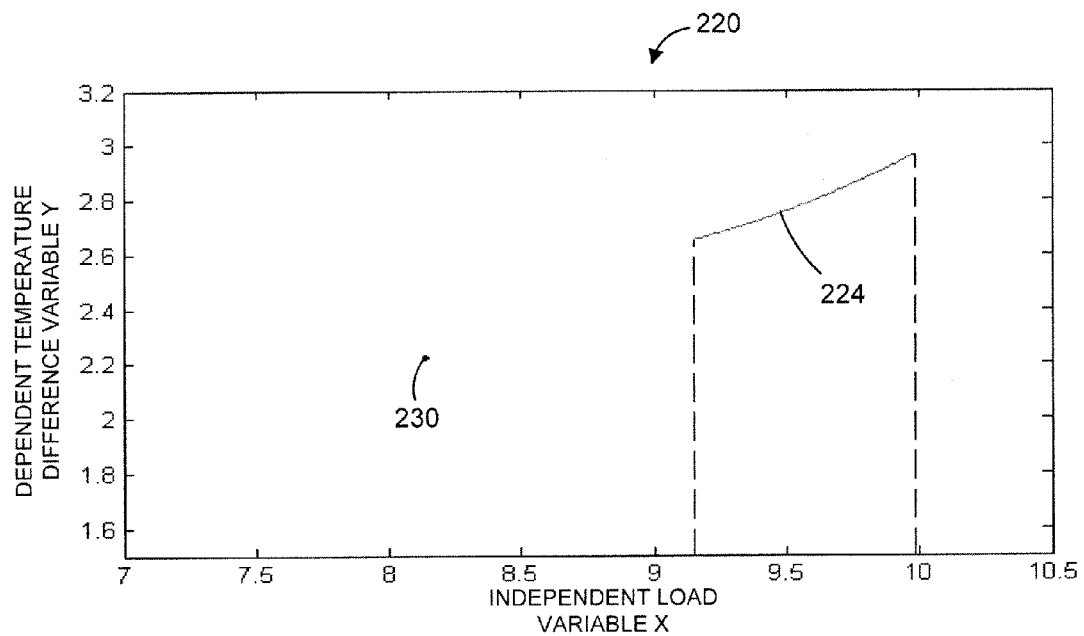
FIG. 8C is a graph showing a received data set that is out of a validity range of the model of FIG. 3B.

The graph 220 of FIG. 8A illustrates operation of the AOD system in the MONITORING state 558. In particular, the AOD system receives the data set 226 that is within the validity range. The model generates a prediction $y_P$ (indicated by the "x" in the graph of FIG. 8A) using the regression model indicated by the curve 224. In FIG. 8C, the AOD system receives the data set 230 that is not within the validity range. This may cause the AOD system to transition to the OUT OF RANGE state 562.

If the operator subsequently causes a LEARN command to be issued, the AOD system will transition again to the LEARNING state 554. The graph 220 of FIG. 9A illustrates operation of the AOD system after it has transitioned back to the LEARNING state 554. In particular, the graph of FIG. 9A includes the group 232 of data sets that have been collected. After an operator has caused a MONITOR command to be issued, or if a maximum number of data sets has been collected, a regression model corresponding to the group 232 of data sets may be generated. The graph 220 of FIG. 9B includes the curve 234 indicative of the regression model corresponding to the group 232 of data sets. Next, an interpolation model may be generated for the operating region between the curves 224 and 234.

Then, the AOD system may transition back to the MONITORING state 558. The graph 220 of FIG. 9C illustrates the AOD system again operating in the MONITORING state 558. In particular, the AOD system receives the data set 236 that is within the validity range. The model generates a prediction $y_P$ (indicated by the "x" in the graph of FIG. 9C) using the regression model indicated by the curve 234 of FIG. 9B.

If the operator again causes a LEARN command to be issued, the AOD system will again transition to the LEARNING state 554, during which a further group of data sets are collected. After an operator has caused a MONITOR command to be issued, or if a maximum number of data sets has been collected, a regression model corresponding to the group of data sets may be generated. Ranges of the other regression models may be updated. For example, the ranges of the regression models corresponding to the curves 224 and 234 may be lengthened or shortened as a result of adding a regression model between the two. Additionally, the interpolation model for the operating region between the regression models corresponding to the curves 224 and 234 are overridden by a new regression model corresponding to a curve between curves 224, 234. Thus, the interpolation model may be deleted from a memory associated with the AOD system if desired. After transitioning to the MONITORING state 558, the AOD system may operate as described previously.

One aspect of the AOD system is the user interface routines which provide a graphical user interface (GUI) that is integrated with the AOD system described herein to facilitate a user's interaction with the various abnormal situation prevention capabilities provided by the AOD system. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the AOD system.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the AOD system described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the AOD system.

Generally speaking, the GUI described herein provides intuitive graphical depictions or displays of process control areas, units, loops, devices, etc. Each of these graphical displays may include status information and indications (some or all of which may be generated by the AOD system described above) that are associated with a particular view being displayed by the GUI. A user may use the indications shown within any view, page or display to quickly assess whether a problem exists within the hydrocracker or a reactor of the hydrocracker depicted within that display.

Additionally, the GUI may provide messages to the user in connection with a problem, such as an abnormal situation, that has occurred or which may be about to occur within the hydrocracker. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

FIGS. 15-19 are exemplary depictions of displays that may be generated for the AOD system and displayed to an operator. In the example shown, a representation 600 of a reactor of the hydrocracker is displayed, such as one of the reactors 64, 66 shown in FIG. 2B. Of course, it should be understood that multiple reactors of the hydrocracker may be displayed. The reactor being monitored has four cross-sections or "beds" across the reactor at which a cross-sectional temperatures are measured, though the number of cross-sections or "beds" may vary depending on the reactor. The temperature for each cross-section, such as the average bed temperature ($WABT_1$-$WABT_4$), is displayed for each cross-section. As noted above with reference to FIG. 2B, the WABT for each cross-section may be provided as a weighted average of multiple temperature measurements $T_i$ that are measured at the cross-section.

Figure 15:
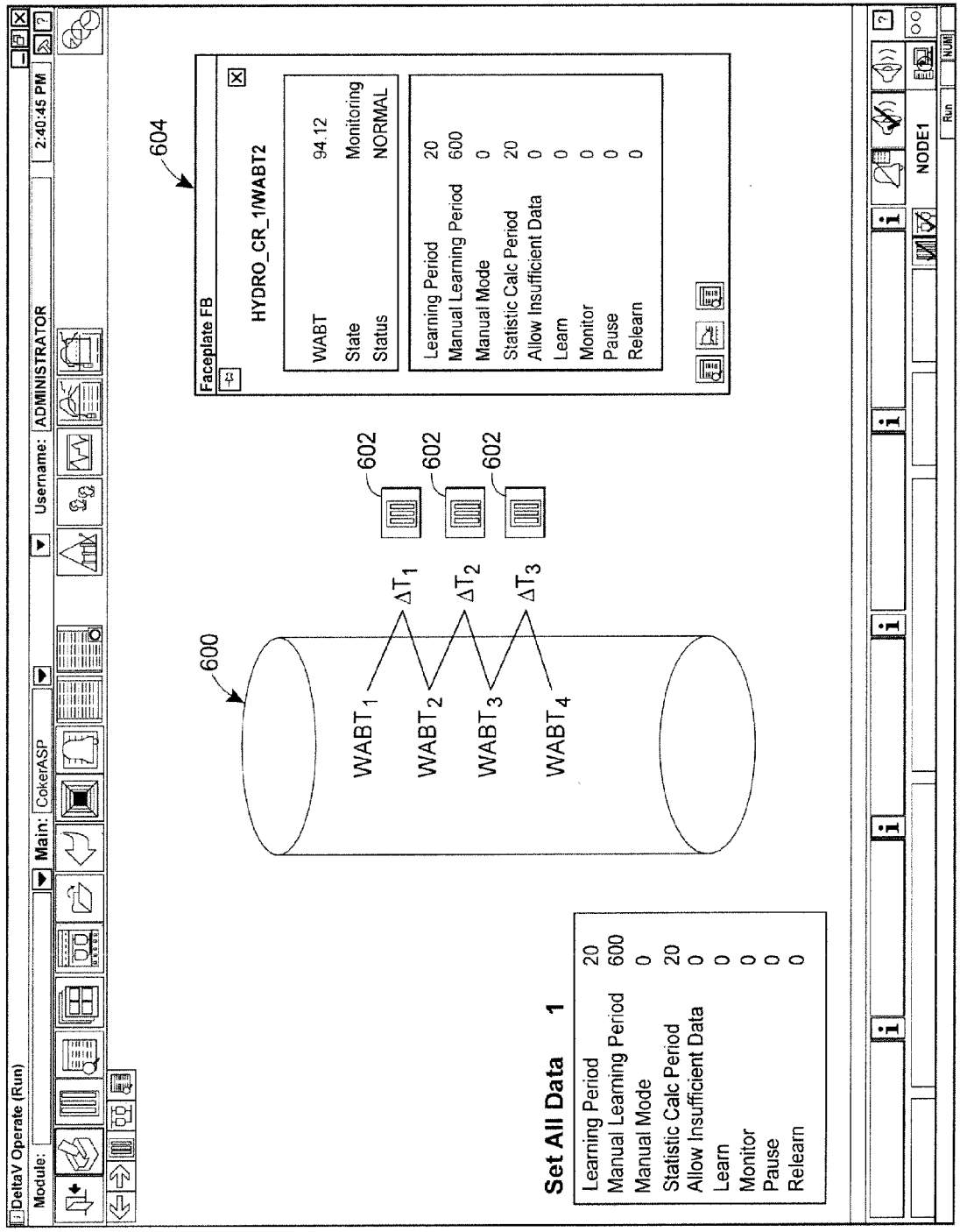
FIG. 15 is an exemplary depiction of a display that may be provided by a graphical user interface to enable a user to view temperature difference variables for a hydrocracker and monitor the occurrence of abnormal conditions.

The temperature difference ($\Delta T_1$-$\Delta T_3$) between each pair of WABT's is calculated and displayed. In one implementation, the representations depicting the $\Delta T$'s may be automatically adjusted by the AOD system to reflect the number of number of $\Delta T$'s being monitored. As shown in FIG. 15, a button 602 is associated with each $\Delta T$, which, if selected, causes a faceplate 604 to be generated in response thereto. It should be understood that although a button is depicted, other methods of selection may be utilized such as radio buttons, dropdown menus or other graphical links, or non-graphical methods of selection (e.g., keyboard, voice, etc.) may be utilized to generate the faceplate 604 associated with a particular temperature difference variable $\Delta T$ or to execute any of a number of options presented by the displays.

The faceplate 604 include a variety of information, including, but not limited to, mode, status, current monitored $\Delta T$ (y), predicted $\Delta T$ ($y_P$), current regression model, quality of regression fit, etc. The faceplate may further provide the ability to control user-configurable parameters, such as learning length, statistical calculation length, regression order and threshold limits, for example. The user-configurable parameters may be controlled by data entry, graphical manipulation, or any of a number of configuration methods.

Figure 16:
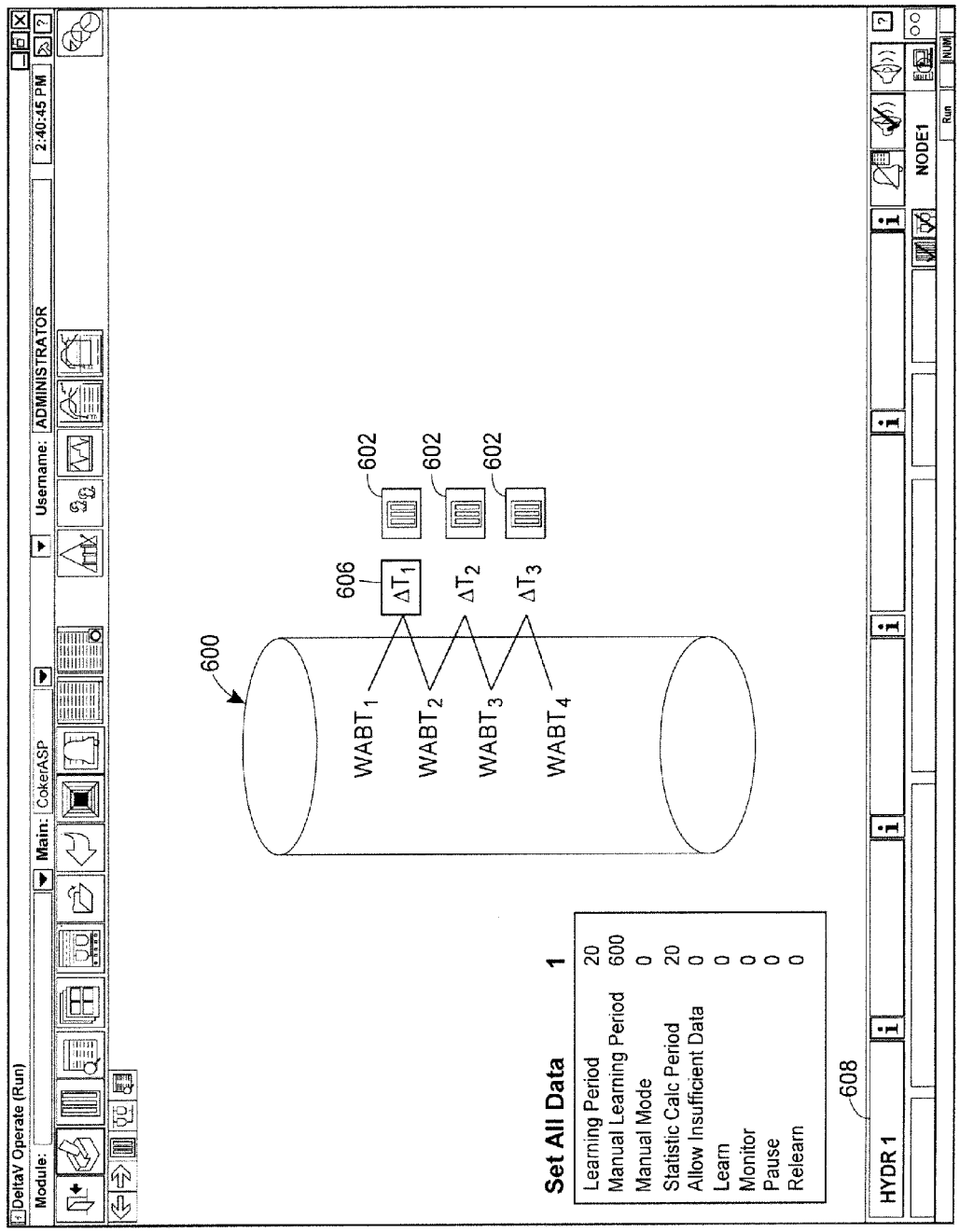
FIG. 16 is an exemplary depiction of a display that may be provided by a graphical user interface to enable a user to view an alert generated in response to detection of an abnormal condition.

When an abnormal situation is detected, such as a significant increase in any of the $\Delta T$'s indicating a temperature runaway condition, an alert or other indication may be generated. Referring now to FIG. 16, if a monitored value (y) of the temperature difference variable $\Delta T_1$ significantly deviates from the predicted value ($y_P$) of the temperature difference variable $\Delta T_1$, the representation of the temperature difference variable associated with the abnormal condition is highlighted 606 and an alarm banner at the bottom of the display shows the alarm 608. Of course, other methods of displaying an alert may be utilized.

Figure 17:
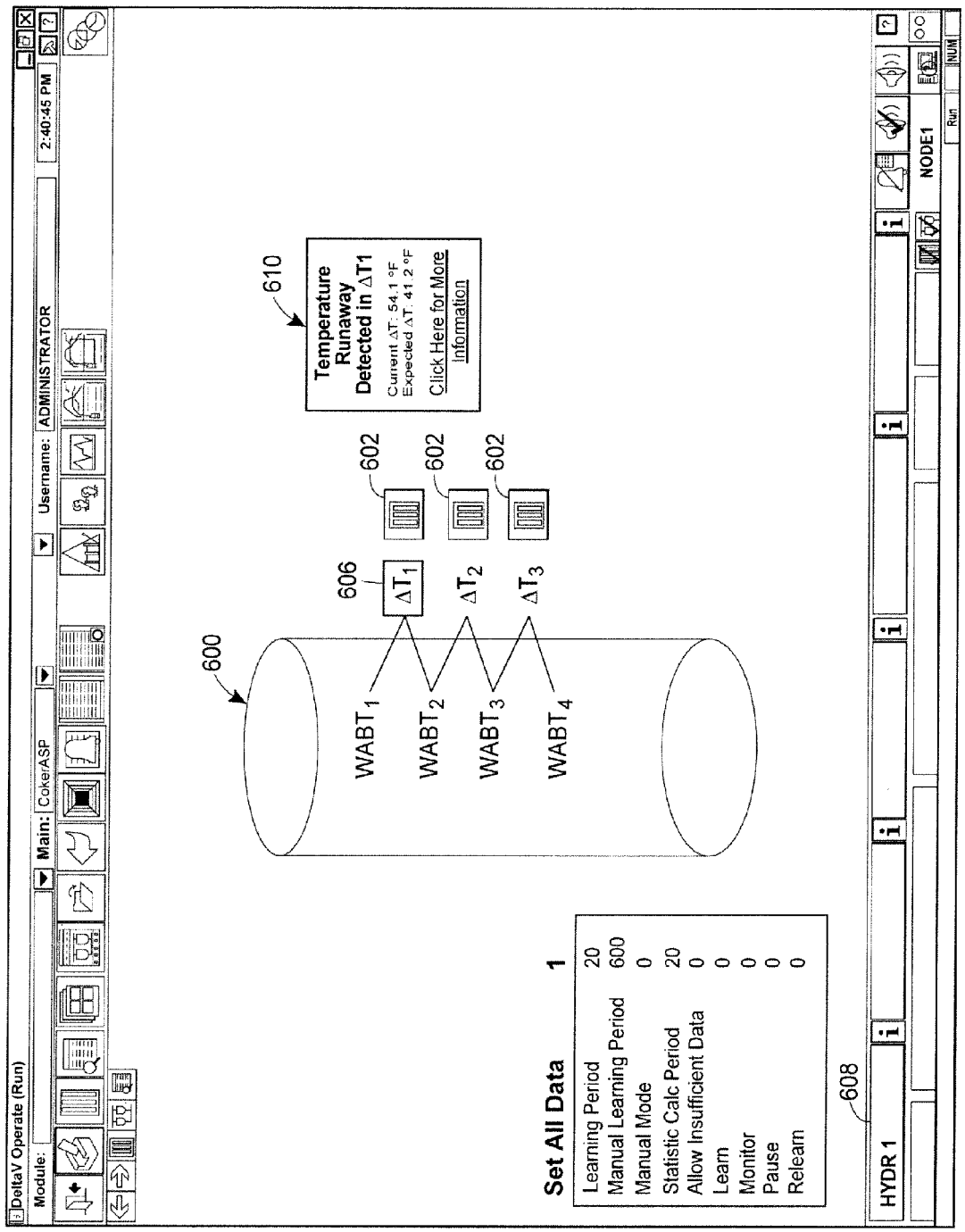
FIG. 17 is an exemplary depiction of a display that may be provided by a graphical user interface to enable a user to view a message associated with the abnormal condition.

The user may request further information relating to the abnormal condition indication, for example by selecting the alarm 608 in the alarm banner or selecting the highlighted temperature difference variable 606. Referring now to FIG. 17, a summary message 610 relating to the abnormal condition is generated in response to the request for further information. The summary message provides at least some further information about the abnormal condition, such as the monitored temperature difference variable value (y) (shown as "current $\Delta T$: 54.1° F.") and the predicted temperature difference variable value ($y_P$) (shown as "expected $\Delta T$: 41.2° F.").

Figure 18:
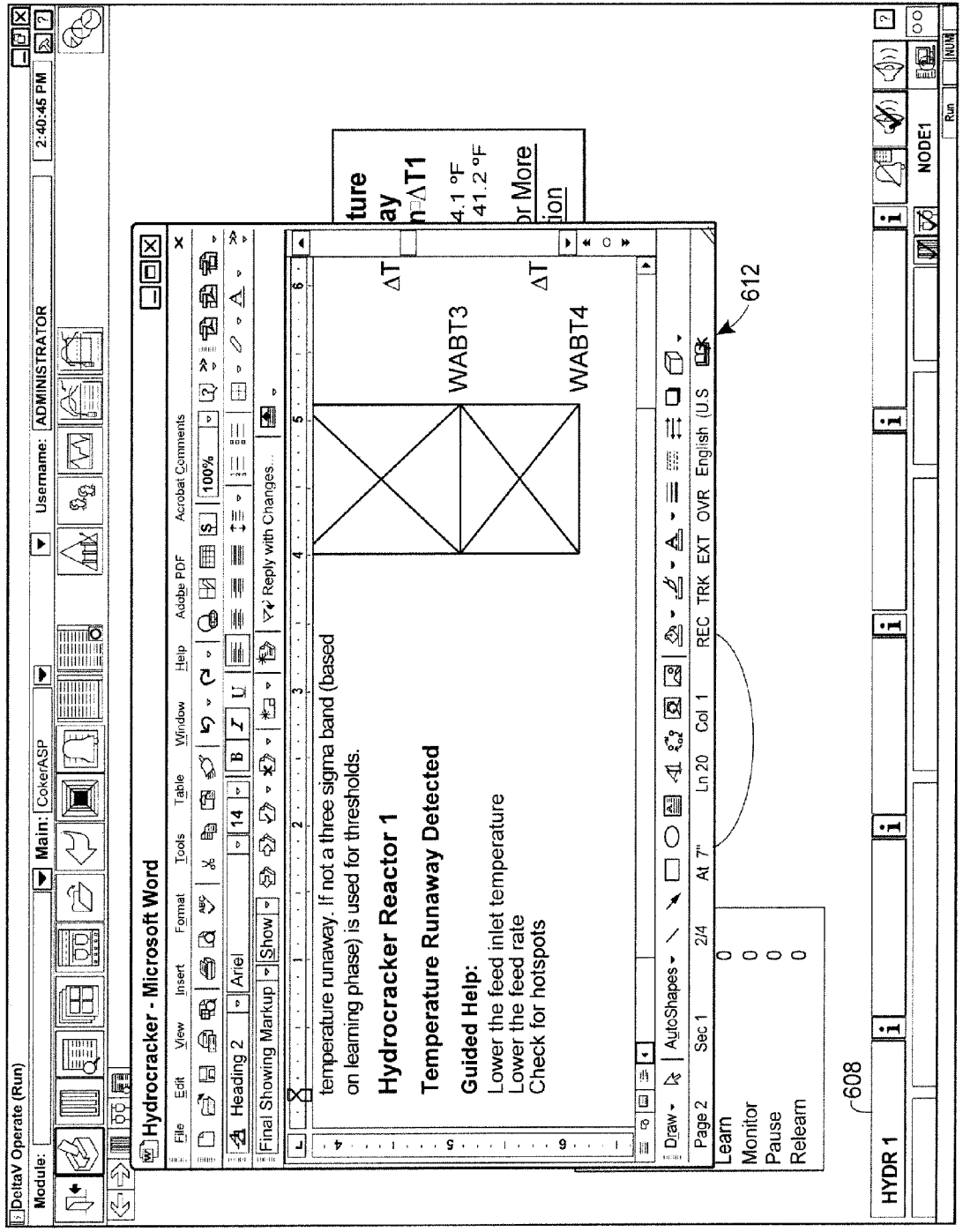
FIG. 18 is an exemplary depiction of a display that may be provided by a graphical user interface to enable a user to view further information associated with the abnormal condition.

As seen in FIG. 17, the summary message 610 provides a graphical link for further, more detailed information relating to the abnormal condition. Referring now to FIG. 18, a display window is generated depicting more detailed information relating to the abnormal condition. The more detailed information may include, but is not limited to, guided assistance to address the abnormal condition, such as instructions to solve the abnormal condition (e.g., temperature adjustment, shutdown, replacement parts order, work order, etc.).

Figure 19:
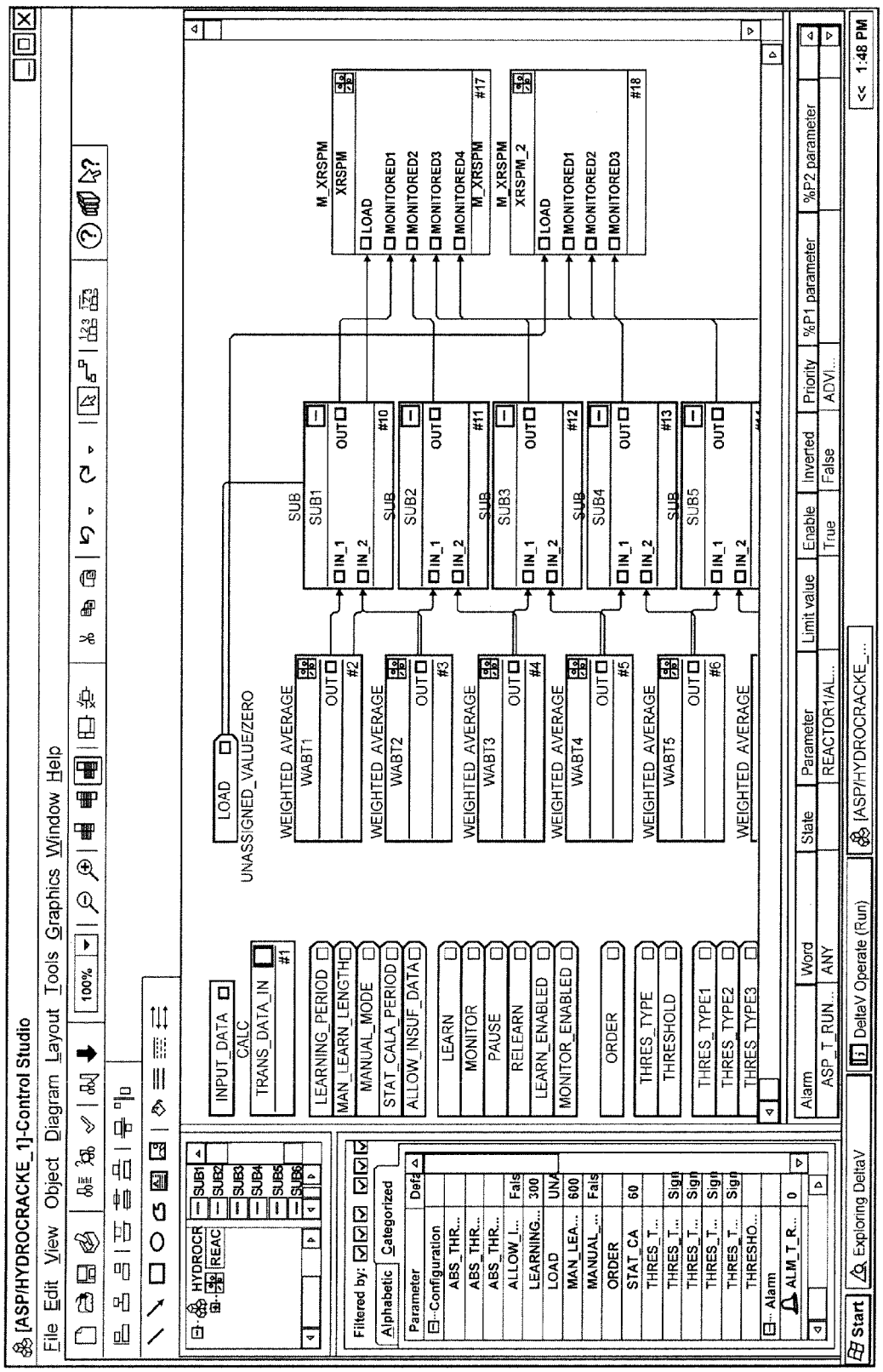
FIG. 19 is an exemplary depiction of a display that may be provided by a graphical user interface to enable a user to view and configure the AOD system.

FIG. 19 is an exemplary display that may be generated to allow an operator to configure and view the AOD system. For example, manipulation of the AOD system may be implemented as a control module, which may have one or more function blocks, on a variety of process control platforms, including, but not limited to the DeltaV™ and Ovation control systems, sold by Emerson Process Management. In other implementation, manipulation of the AOD system may be implemented as a field device interface module, such as the Rosemount 3420 sold by Emerson Process Management. In yet another implementation, manipulation of the AOD system may be implemented as a stand-alone algorithm. In the example of FIG. 19, manipulation of the AOD system is illustrated as an abnormal situation prevention module implemented in DeltaV™, and allows an operator to configure the AOD system. For example, the operator may control the LEARN and MONITOR phases of the AOD system, specify the WABT's to include, specify the statistical blocks, if any, to utilize, specify automatic or manual modes of operation, vary the learning length, vary the statistical calculation period, enable relearning for different operating regions, specify deviation thresholds, or any of a number of configurable options associated with the AOD system.

Although examples were described in which a regression model comprised a linear regression model of a single dependent variable as a function of a single independent variable, one of ordinary skill in the art will recognize that other linear regression models and non-linear regression models may be utilized. One of ordinary skill in the art will also recognize that the linear or non-linear regression models may model multiple dependent variables as functions of multiple independent variables.

The AOD systems, models, regression models, interpolation models, deviation detectors, logic blocks, method blocks, etc., described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer, processor, I/O device, field device, interface device, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A computer implanted method of facilitating detection of an abnormal operation of a hydrocracker, using a computer having a non-transitory computer-readable storage medium having a computer executable instructions stored in the non-transitory computer-readable storage medium for implementing the method, the method comprising:

collecting first data sets generated from a temperature difference variable between a first cross section in a reactor of the hydrocracker and a second cross section in the reactor of the hydrocracker while the hydrocracker is in a first operating region and generated from a load variable of the hydrocracker while the hydrocracker is in the first operating region;

generating a first regression model of the process in the first operating region using the first data sets;

determining a first range in which the first regression model is valid;

generating a model of the hydrocracker to include the first regression model; collecting second data sets generated from the temperature difference variable between the first cross section in a reactor of the hydrocracker and the second cross section in the reactor of the hydrocracker while the hydrocracker is in a second operating region and generated from a load variable of the hydrocracker while the hydrocracker is in the second operating region;

generating a second regression model of the hydrocracker in the second operating region using the second data sets;

determining a second range in which the second regression model is valid; and revising the model of the hydrocracker to include the first regression model for the first range and the second regression model for the second range.

2. The method of claim 1, further comprising:
prior to collecting the second data sets, receiving a data set outside of the first range; and
generating an indicator that the received data set is outside of a valid range of the hydrocracker model;
wherein collecting the second data sets comprises collecting the second data sets in response to receiving an authorization.

3. The method of claim 2, wherein the authorization comprises an authorization to train the model for the second operating region.

4. The method of claim 3, wherein the authorization comprises an authorization to begin monitoring the hydrocracker;
wherein generating the second regression model comprises generating the second regression model in response to receiving the authorization to begin monitoring the hydrocracker after receiving authorization to train the model.

5. The method of claim 2, further comprising revising the model in response to receiving the authorization.

6. The method of claim 2, wherein the authorization comprises a user authorization.

7. A system for detecting an abnormal operation in a hydrocracker in a process plant, comprising:
a configurable model of the hydrocracker in the process plant, the configurable model including a first regression model in a first range corresponding to a first operating region of the hydrocracker, the configurable model capable of being subsequently configured to include a second regression model in a second range corresponding to a second operating region different than the first operating region, wherein the configurable model is capable of generating a prediction of a temperature difference variable value as a function of a load variable value, wherein the temperature difference variable value is generated from a temperature difference between a first cross section in a reactor of the hydrocracker and a second cross section in the reactor of the hydrocracker; and
a deviation detector coupled to the configurable model, the deviation detector configured to determine if the temperature difference variable value differs from the predicted temperature difference variable value by comparing a difference between the temperature difference variable value and predicted temperature difference variable value to a threshold.

8. The system of claim 7 wherein, after the configuration model is configured to include the second regression model, the configurable model is capable of:
generating the prediction of the temperature difference variable value using the first regression model if the load variable value is in the first range,
generating the prediction of the temperature difference variable value using the second regression model if the load variable value is in the second range.

9. A system for detecting an abnormal operation in a hydrocracker in a process plant, comprising:
a configurable model of the hydrocracker in the process plant, the configurable model including a plurality of regression models regression model in a range corresponding to an operating region of the hydrocracker, wherein the configurable model is capable of generating a plurality of predictions of temperature difference variable values each as a function of a load variable value, wherein each temperature difference variable value is generated from a corresponding temperature difference between cross sections in a reactor of the hydrocracker;
a deviation detector coupled to the configurable model, the deviation detector configured to determine if at least one of the temperature difference variable values differs from the corresponding predicted temperature difference variable value by comparing a difference between the at least one of the temperature difference variable values and the corresponding predicted temperature difference variable value to a threshold; and
an integration application stored on a non-transitory computer readable memory and adapted to be executed on a processor to create a representation of the hydrocracker for use in viewing the temperature difference variable value and for use in viewing an indication of an abnormal operation of the hydrocracker in response to comparing the difference between the temperature difference variable value and the predicted temperature difference variable value to a threshold, and wherein the integration application is configured to create an indication of an abnormal operation of the hydrocracker if a difference between at least one of the temperature difference variable values and the corresponding predicted temperature difference variable value exceeds the threshold and generates an identification of the temperature difference variable causing the abnormal operation.

* * * * *

UNITED STATES PATENT AND TRADEMARK OFFICE
CERTIFICATE OF CORRECTION

| | | |
|---|---|---|
| PATENT NO. | : 8,010,292 B2 | Page 1 of 1 |
| APPLICATION NO. | : 11/863169 | |
| DATED | : August 30, 2011 | |
| INVENTOR(S) | : Ravi Kant et al. | |

It is certified that error appears in the above-identified patent and that said Letters Patent is hereby corrected as shown below:

At Column 20, line 2, "blocks" should be -- block --.

Signed and Sealed this
Nineteenth Day of March, 2013

Teresa Stanek Rea
*Acting Director of the United States Patent and Trademark Office*